A. E. KEITH.
TELEPHONE SYSTEM.
APPLICATION FILED OCT. 21, 1904. RENEWED MAY 24, 1918.
1,290,837.
Patented Jan. 7, 1919.
11 SHEETS—SHEET 10.
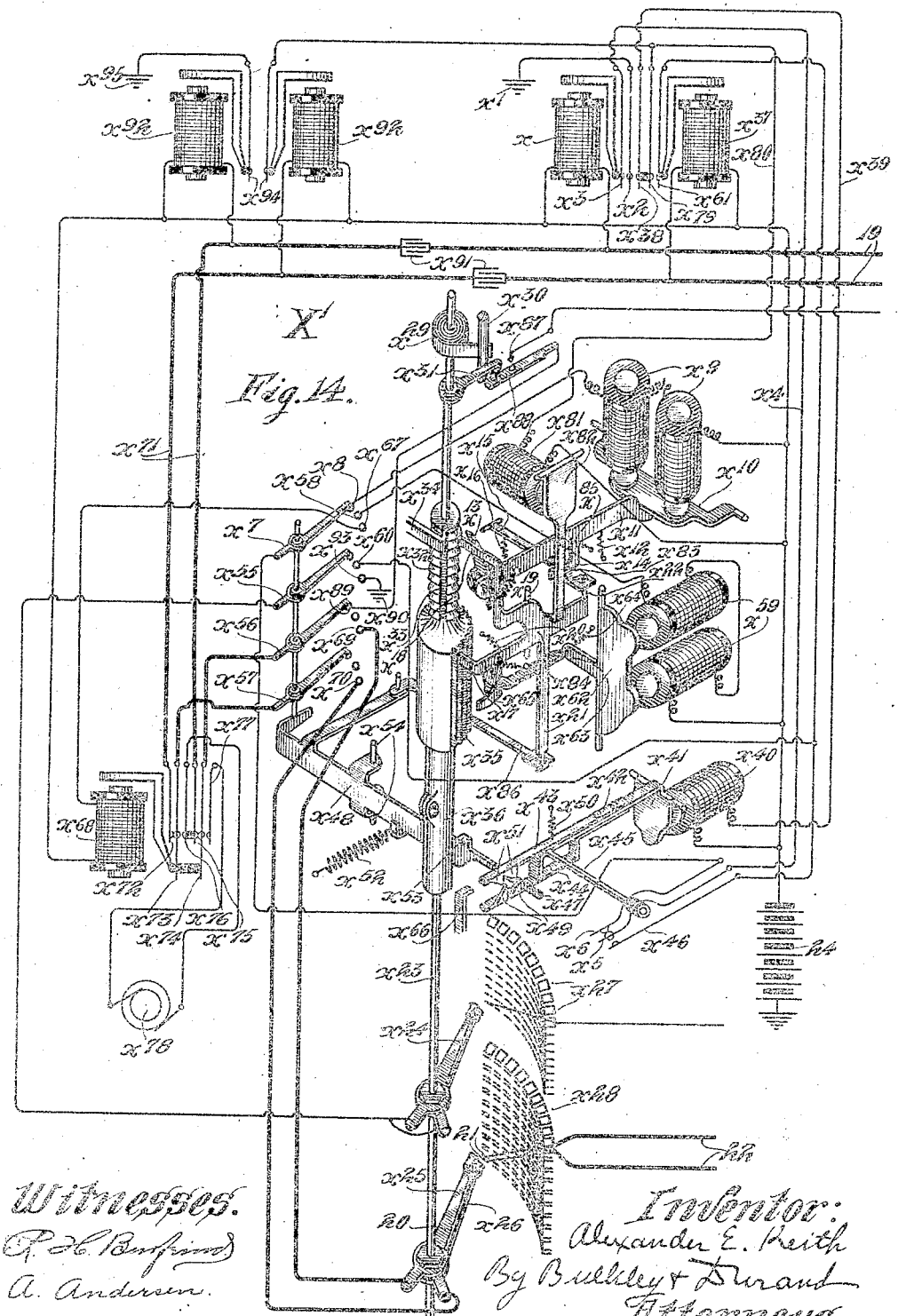

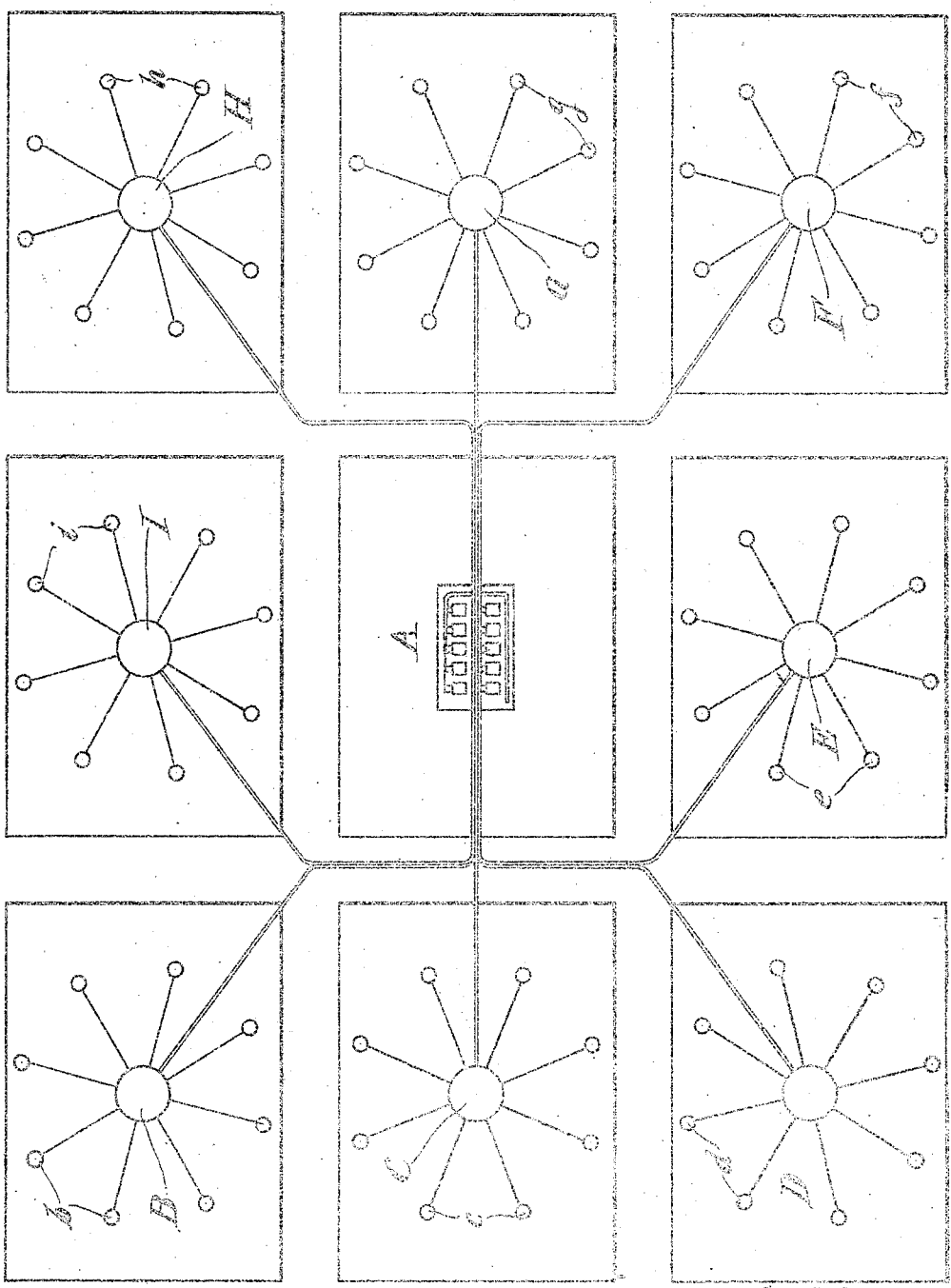

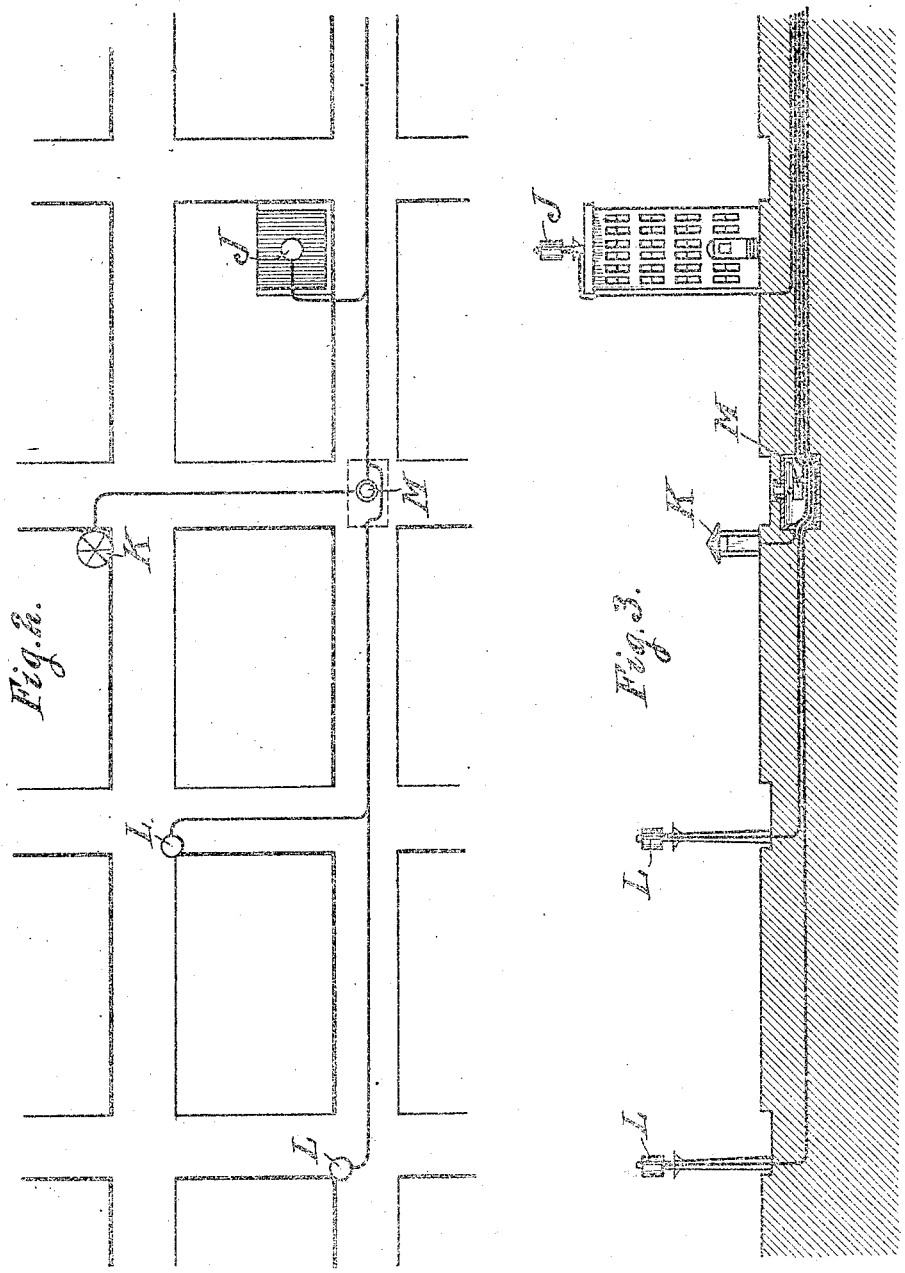

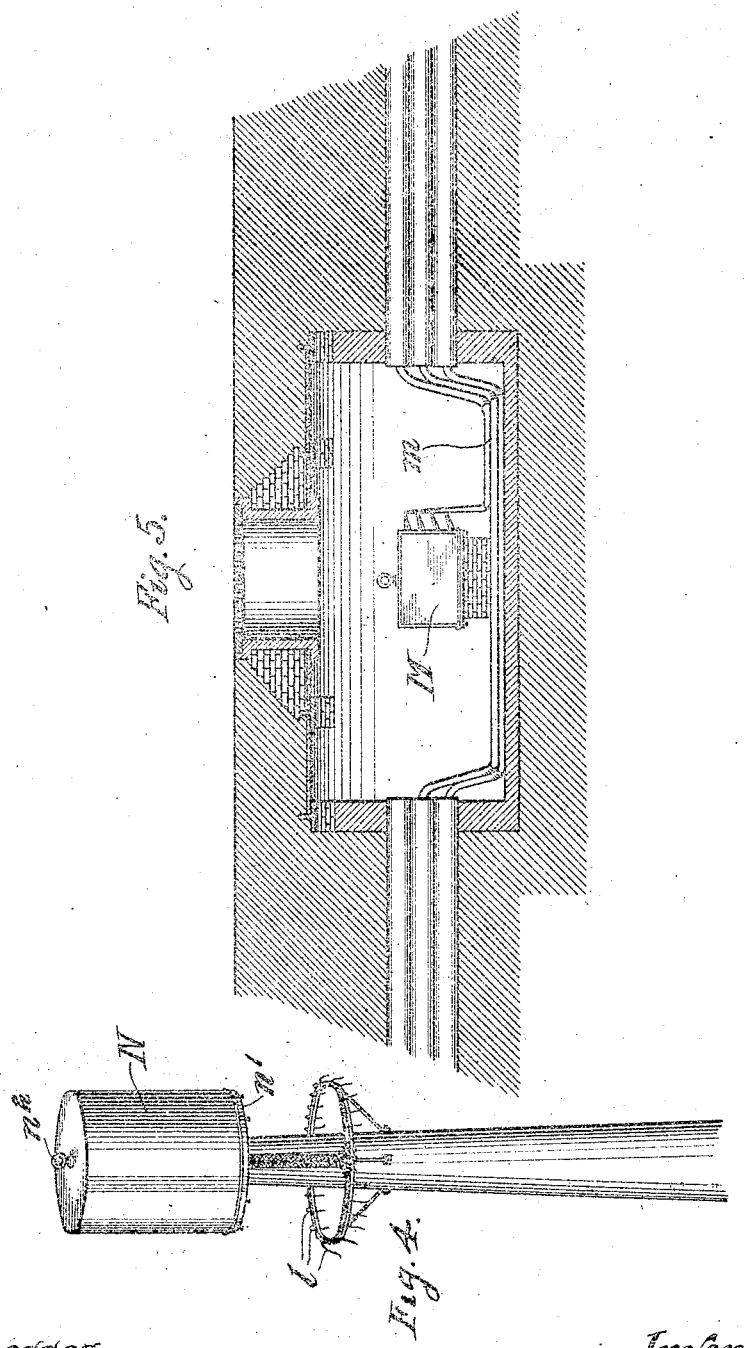

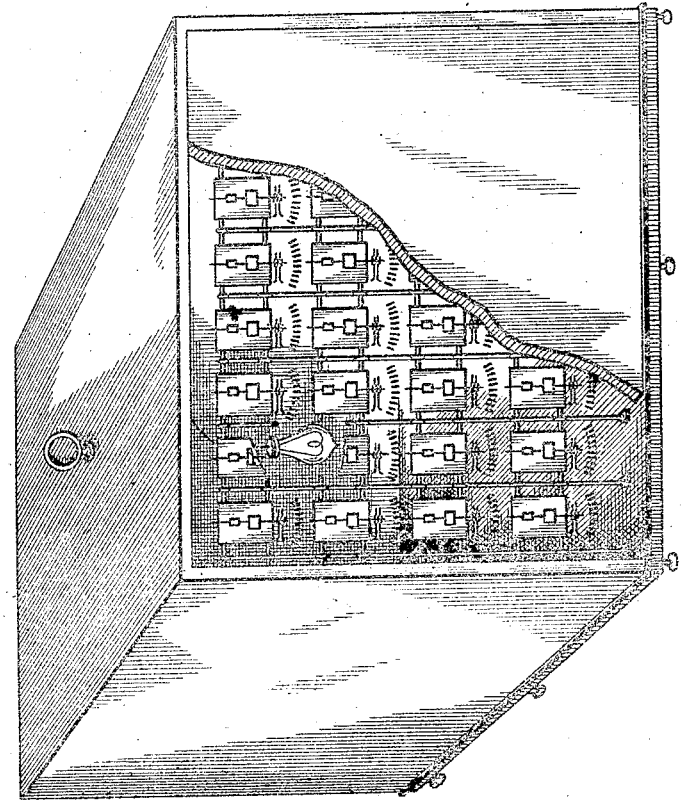
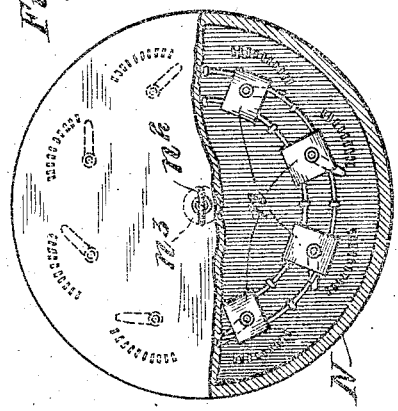
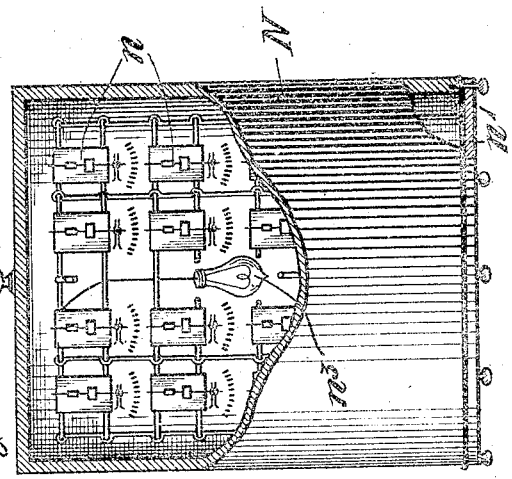

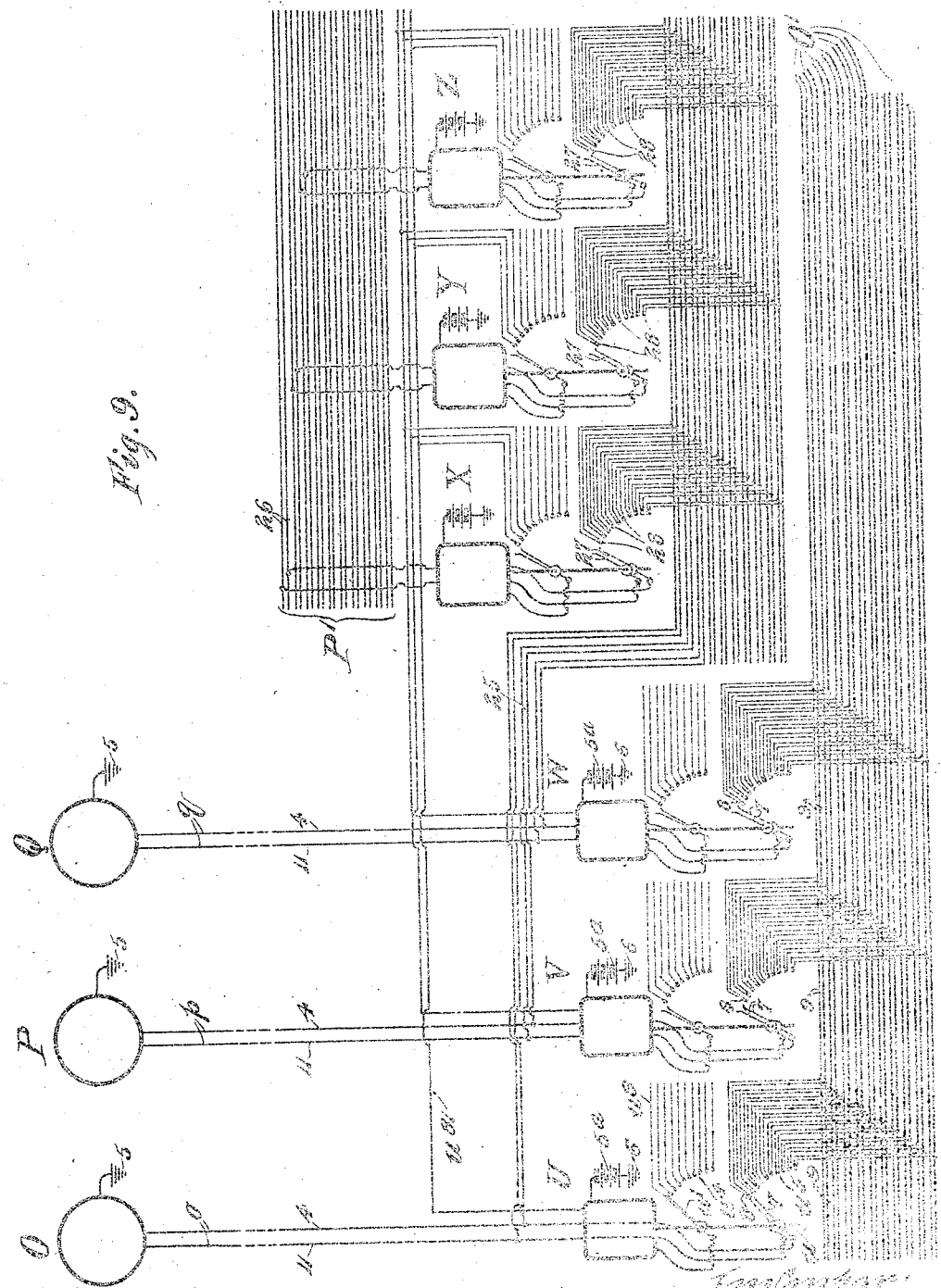

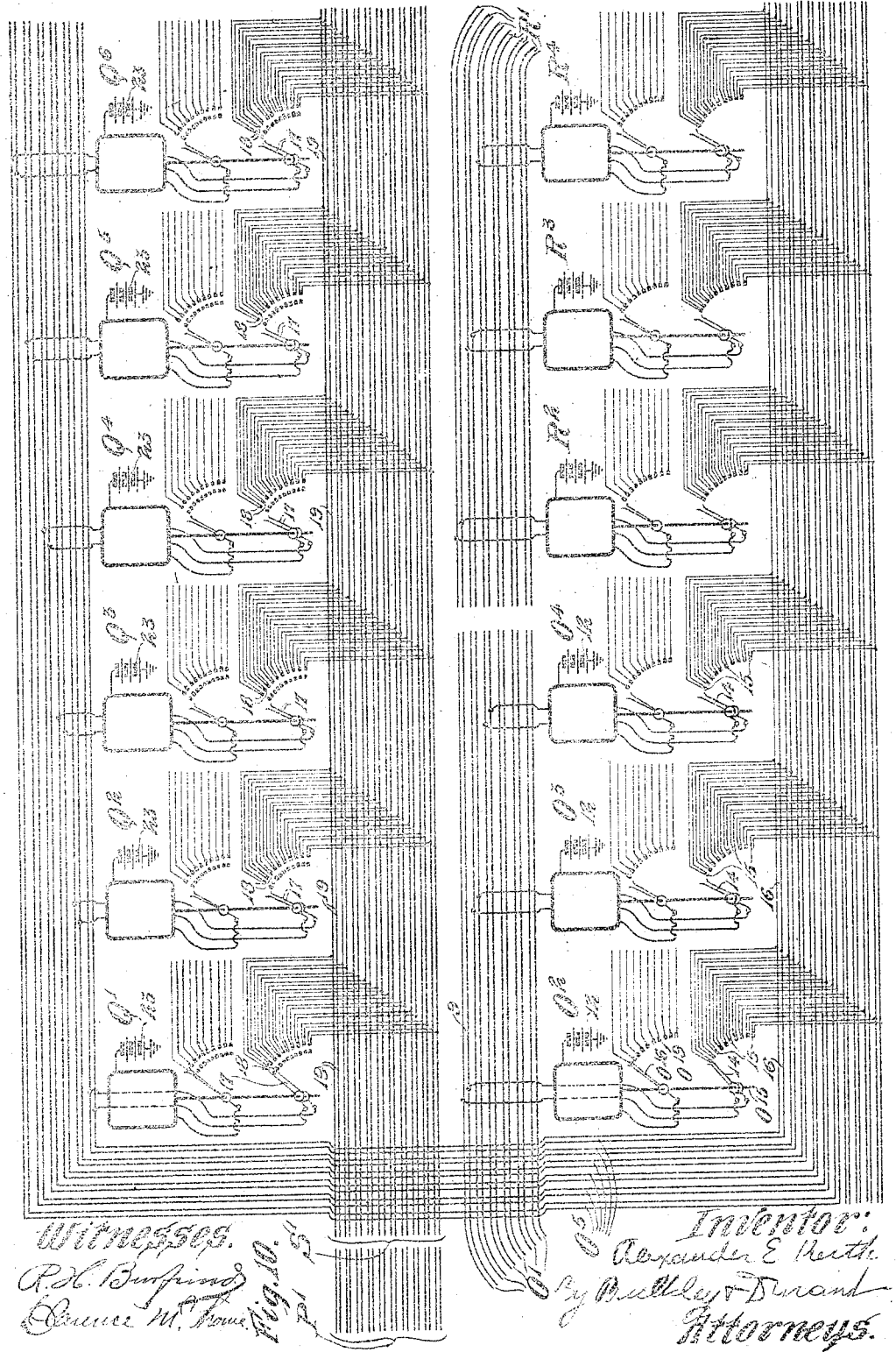

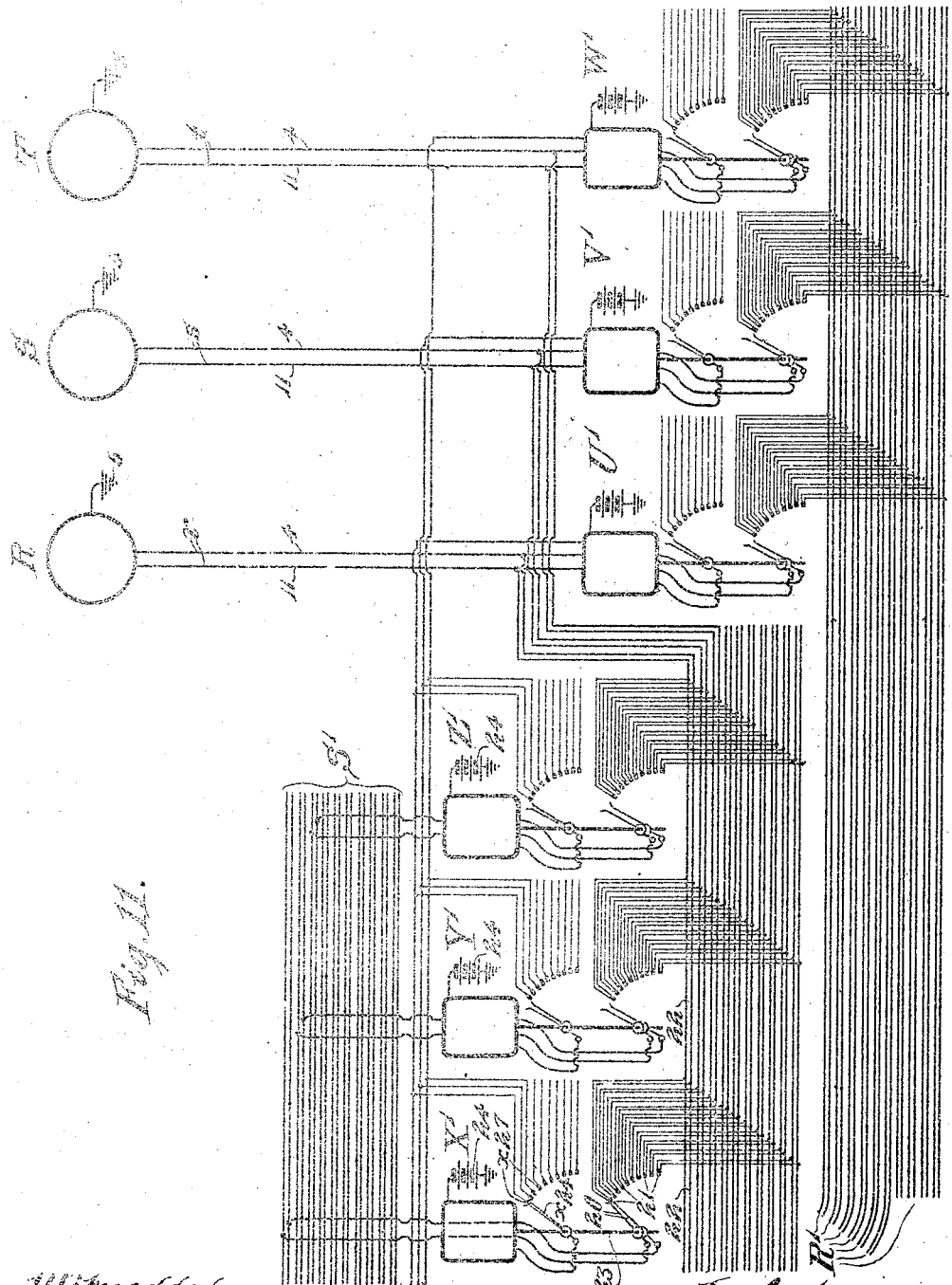

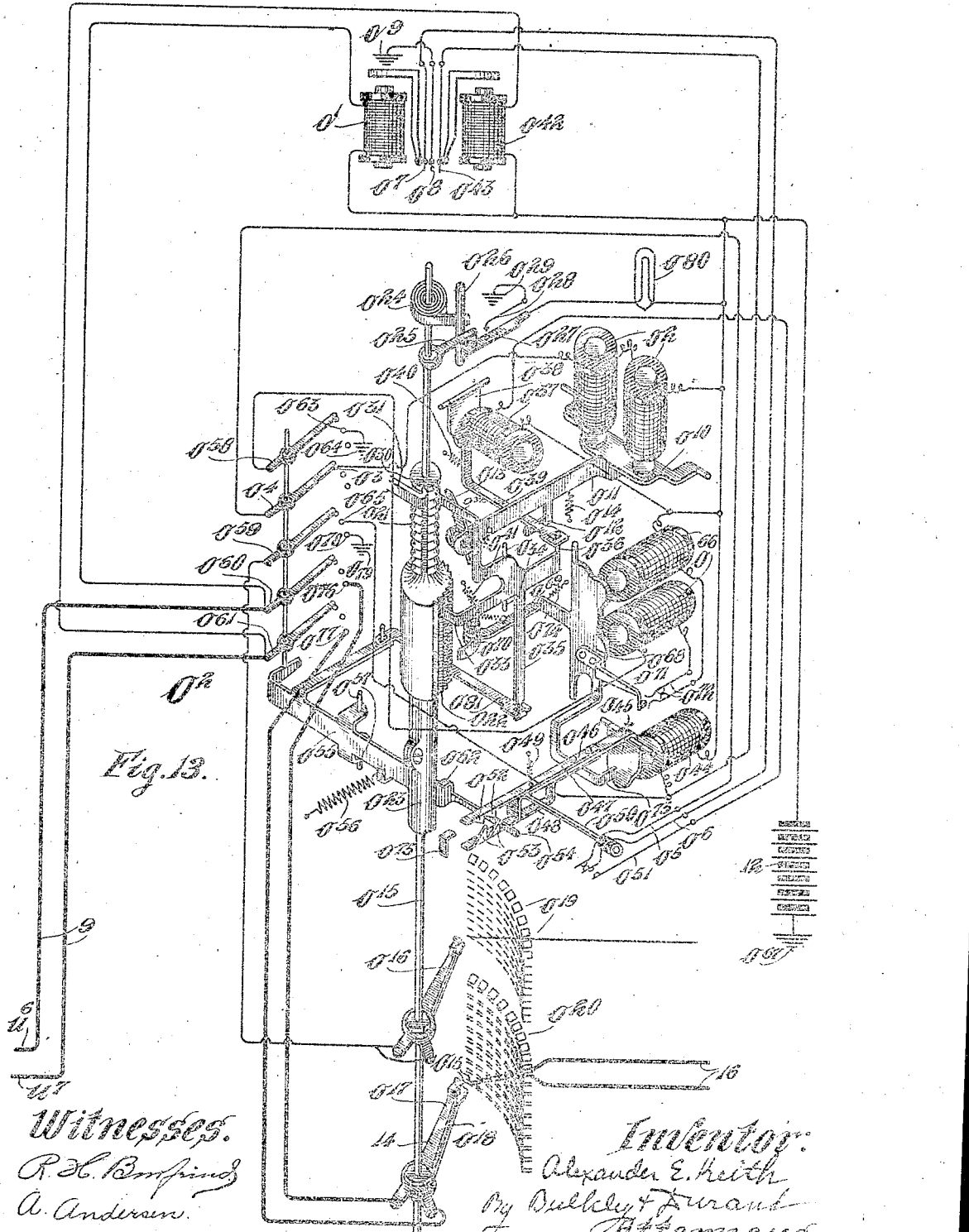

A. E. KEITH.
TELEPHONE SYSTEM.
APPLICATION FILED OCT. 21, 1904. RENEWED MAY 24, 1918.
1,290,837.
Patented Jan. 7, 1919.
11 SHEETS—SHEET 11.
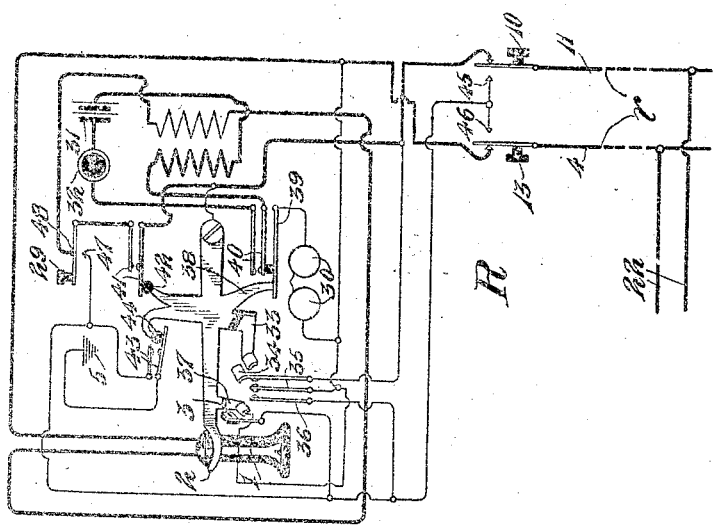
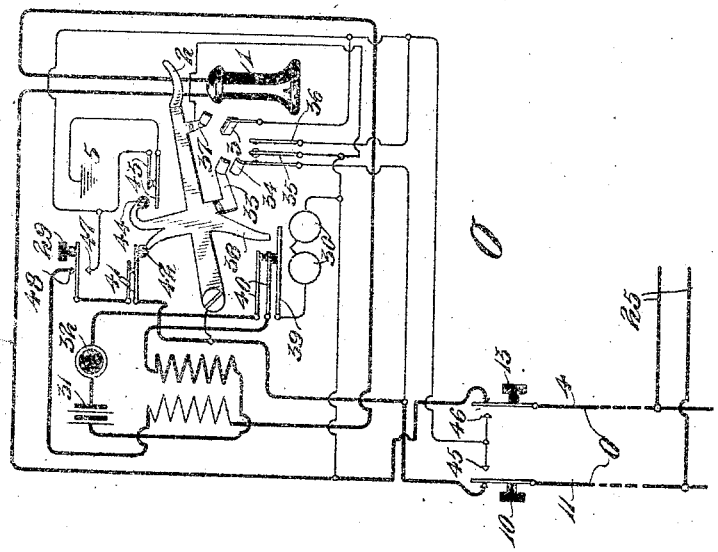

UNITED STATES PATENT OFFICE.

ALEXANDER E. KEITH, OF CHICAGO, ILLINOIS, ASSIGNOR, BY MESNE ASSIGNMENTS, TO AUTOMATIC ELECTRIC COMPANY, A CORPORATION OF ILLINOIS.

TELEPHONE SYSTEM.

1,290,637.   Specification of Letters Patent.   Patented Jan. 7, 1919.

Application filed October 21, 1904, Serial No. 229,373. Renewed May 24, 1918. Serial No. 236,413.

*To all whom it may concern:*

Be it known that I, ALEXANDER E. KEITH, a citizen of the United States of America, and resident of Chicago, in the county of Cook and State of Illinois, have invented a certain new and useful Improvement in Telephone Systems, of which the following is a specification.

My invention relates to telephone systems in general, but more especially to automatic telephone systems.

My invention contemplates a telephone system characterized by a number of novel features and advantages. For example, and looking at it in one way, it contemplates a telephone system having an exchange composed of main and auxiliary trunking stations, the said auxiliary trunking stations being connected with the main trunking station by trunk lines, whereby connection between any two of the subscribers' lines radiating from the different auxiliary stations can only be established through the medium of the main trunking station, and whereby the said main and auxiliary stations really constitute but a single exchange. In a system of this character, which obviously may be either automatic or otherwise, it is obvious that several hundred subscribers' lines can be connected with each auxiliary trunking station, while the medium of connection between each auxiliary station and the main trunking station may consist of a much smaller number of trunk lines, every connection, whether it be between subscribers' lines radiating from the same or different auxiliary trunking stations, being possible only by way, and through the medium, of the main trunking exchange. It is obvious, of course, that a single exchange of this character may have a suitable trunking connection with another exchange, either of a similar or different character; but in a telephone system of the above character, and regardless of whether the switching is done automatically or in some other known or approved manner, it is evident that at least two trunk lines are necessary in accomplishing connection between any two subscribers' stations; and that for this reason the trunk lines employed between the main and auxiliary trunking stations are not the ordinary trunk lines employed for giving service to subscribers of two distinct or different exchanges, but are simply trunk lines for affording a telephonic connection between subscribers of the same exchange. Again, and considered in another aspect, it will be seen that my invention contemplates a telephone system in which the connection between subscribers' stations and the main or central station consists, in each case, of a plurality of normally disconnected line sections, whereof one is an individual or private line connection leading from the subscriber's station to a switching apparatus, and whereof the other section or sections comprise a trunk line connection which extends from such switching apparatus to the main or central station, and which is therefore used in common by any desired or practicable number of subscribers. Thus considered, and regardless of whether the switching apparatus is automatic or of some other known or approved character, each group of subscribers must rely upon one or more trunk lines extending between the junction point of their private or individual line connections and the main or central station, but from which their said private or individual line connections are normally disconnected. Also, if embodied in an automatic system employing an automatic switching device of any known or approved character, my invention contemplates a system in which a call originates at an auxiliary trunking station, passes over a trunk line to the main or central trunking station, and then proceeds over another trunk line to a distant auxiliary trunking station; and this last auxiliary trunking station, or station at which connection is finally made with the desired subscriber's line, may be either the same or a different auxiliary trunking station from which the call originated, and in any event is the auxiliary station at which the last two decimals or digits of the number called are made; it being understood, of course, in this connection, that if automatic apparatus is employed, the same is of that well-known type or principle in which the decimal system is employed in a manner well known to those skilled in the art. Furthermore, and by employing automatic apparatus, it will be seen that the individual switching devices, or other switching apparatus, of each auxiliary trunking station can be inclosed in an airtight casing or inclosure located either in or on top of a building, in a man-hole, on top of a pole, in a police box, or in any other suitable location; and it is thus evident that my invention not only contemplates a feature of this character, but also the heating of the interior of such air-tight inclosure by means of an incandescent electric lamp, or other superheating means, so as to prevent the inclosed apparatus from rusting or corroding, and so as to preserve as near as possible and at all times practically the same desired degree of temperature. In this way, it is possible to provide an automatic telephone system comprising a main and auxiliary trunking stations, the main trunking station being situated in a suitable building, while the auxiliary trunking stations consist merely of comparatively small air-tight casings or inclosures containing the necessary automatic switching devices and located in any convenient place or locality; and it is obvious that these auxiliary trunking stations can be exposed to the weather or protected by a building without in any way interfering with the efficiency of the apparatus and system as a whole. All of these, and other aspects, both broad and specific, are within the contemplation of my invention; and the advantages of a system of the foregoing character, and of its different features and aspects, will hereinafter more fully appear, although it may be stated at this juncture that the object of the invention, generally stated, is to provide a telephone system which will be cheaper and more economical to install and maintain, particularly with respect to the wiring or line connection between the different stations.

In the accompanying drawings, Figure 1 is a graphic or diagrammatic representation of the method of wiring or connecting up the main and auxiliary trunking stations with the subscribers' stations of a telephone system embodying the principles of my invention;

Figs. 2 and 3 are respectively a plan and an elevation illustrating in a more or less diagrammatic manner the method of locating the auxiliary trunking stations in different ways and places;

Fig. 4 is a perspective view of a pole-top form of auxiliary trunking station;
Fig. 5 shows a man-hole form of auxiliary trunking station;

Figs. 6, 7 and 8 illustrate round and square constructions of casing or inclosure for the auxiliary trunking station apparatus, and show the method of heating the interior of such inclosure;

Figs. 9, 10 and 11 are respectively the left-hand, middle and right-hand portions of a single diagram illustrating the apparatus of the main and auxiliary trunking stations, and showing three subscribers' stations which are connected with each of the two auxiliary trunking stations.

Fig. 13 shows the electrical and mechanical construction of one of the first "selectors," or of one of the second "selectors," as the case may be.

Fig. 14 shows the wiring and mechanical construction of a "connector."

Fig. 15 illustrates the calling subscriber's apparatus.

Fig. 16 illustrates the called subscriber's apparatus.

Figure 12:
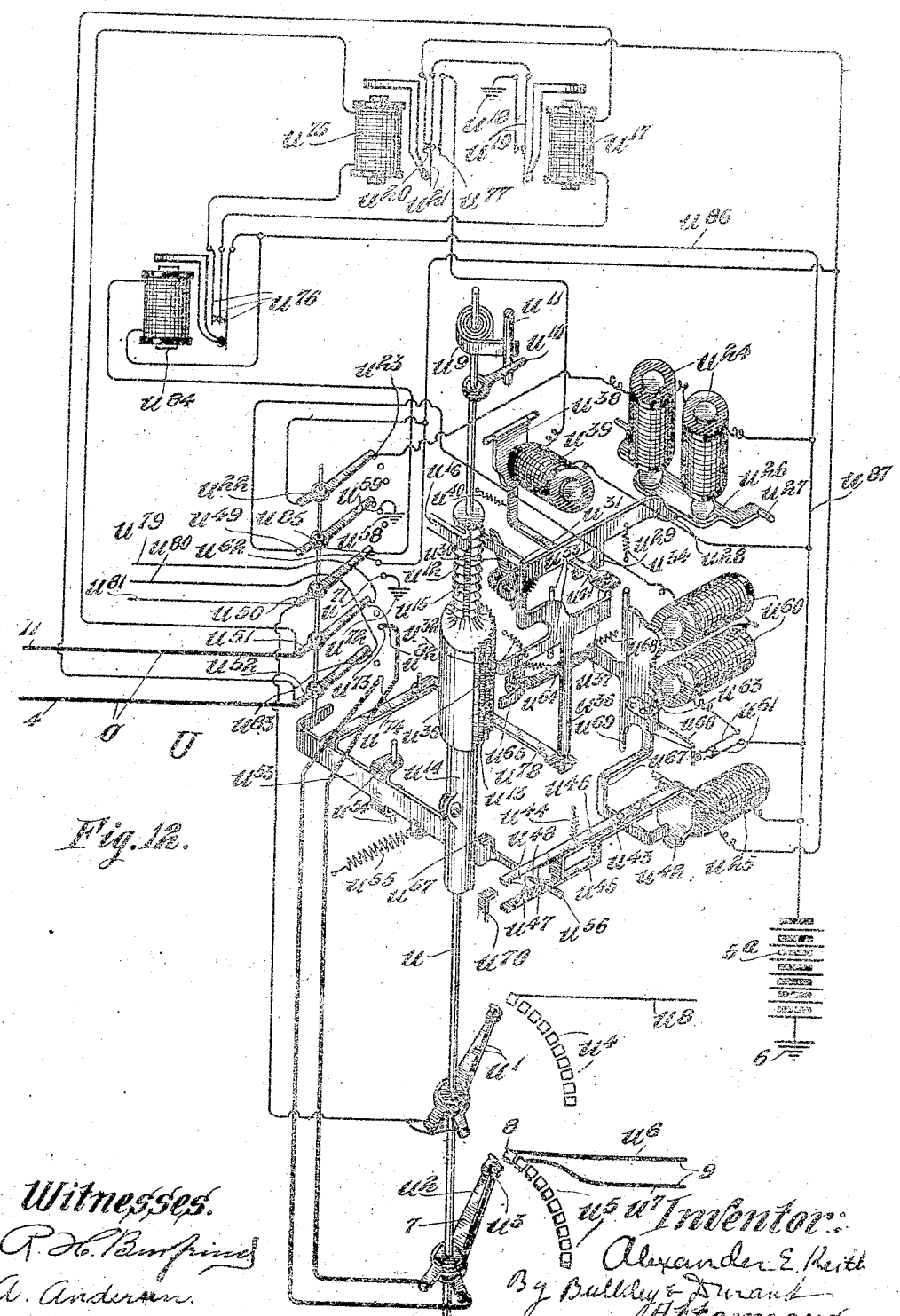
Fig. 12 illustrates the mechanism and wiring of one of the "individual-switches."

There are many existing and well understood kinds of switchboard apparatus. There is the well-known manual board in which the connections between subscribers' lines are established manually by means of cord-circuits and plug-switches; and there are also, at the present time, several forms of automatic apparatus which are well known to those skilled in the art—that is to say, automatic switching apparatus whereby connection between one subscriber's line and another is accomplished automatically by the calling subscriber, without the aid of a switchboard operator. For this reason, it is evident that no detail or extensive description of such apparatus is necessary, although some well-known automatic apparatus is hereinafter described. It is within the contemplation of my invention to employ either manual or automatic apparatus; but in view of the fact that better service and better results, in various ways, are obtained by the use of automatic apparatus, I prefer to employ any suitable automatic telephone apparatus. In fact, the general scheme of my invention seems to lend itself to greater advantage to automatic telephone service, as will hereinafter more fully appear; but at the same time it will be readily understood that, as previously stated, the apparatus employed at the main and auxiliary trunking stations, and at the subscribers' stations, may be of any suitable, known or approved form. In view of these facts, I have not, therefore, in the drawings, attempted to minutely or exhaustively illustrate the details and mechanical construction of the different devices and apparatus, but have simply shown clearly the method of connecting the main trunking station with the auxiliary trunking stations, and of connecting the subscribers' stations with the said auxiliary stations; and in so doing the automatic switching devices at the said trunking stations have been shown more or less diagrammatically and only in such manner as is necessary to a full understanding of my invention. Indeed, the automatic switchboard apparatus shown in Figs. 9, 10 and 11, and in Figs. 12, 13 and 14, is of the character well understood by those skilled in the art, and will be instantly recognized as such. It is also evident that the calling devices at the subscribers' stations, in an automatic system of this character, may be of any suitable or desired character consistent with their function of operating the "selector-switches" and "connector-switches" at the trunking stations, these being the terms commonly employed in designating the automatic switchboard devices of the character shown in the diagrams; and it will also be understood, in this connection, that in the system herein shown and described the apparatus is operated on the step-by-step principle, which, of course, necessitates the employment at the subscribers' stations of any suitable make-and-break devices for transmitting electrical impulses over the line circuits for the purpose of operating the said step-by-step switches at the trunking stations. It is also evident that the telephone instruments may be of any suitable character, the invention relating more to the apparatus for establishing the connections, than to the means for carrying on telephonic communication; and for this reason the receivers, transmitters, switch-hooks, etc., for example, have been illustrated diagrammatically. As a matter of fact, my invention, broadly stated, is an improved signaling system, and is not limited to use in connection with telephonic apparatus.

As illustrated, however, and referring to Fig. 1 of the drawings, my invention comprises a main trunking station A, and any suitable desired or practicable number of auxiliary trunking stations connected with the main trunking station by trunk lines. For example, the main trunking station may be located in a suitable building, and the auxiliary trunking stations B, C, D, E, F, G, H and I can be located at various points more or less remote from the said main trunking station. As one illustration, the said main trunking station may be located in one block of a city or town, and the auxiliary trunking stations then located in the other blocks—that is to say, an auxiliary trunking station can be allotted to each block in a city or town, or to any given number of subscribers. As illustrated, the subscribers' stations $b$, $c$, $d$, $e$, $f$, $g$, $h$ and $i$ are connected by private or individual line wires with their allotted auxiliary trunking stations. It is obvious, however, that the auxiliary trunking stations can be built for any desired number of subscribers; but I find that an arrangement involving 200 or less, perhaps not more than 100, subscribers for each auxiliary trunking station gives satisfactory results, as such a number for each station is easier to handle. If 200 subscribers are allotted to each auxiliary trunking station, any suitable number of trunk lines can then be employed between each auxiliary trunking station and the main trunking station; and with 100 subscribers allotted to each auxiliary trunking station, I find that 20 trunk lines between each auxiliary trunking station and the main trunking station gives good results. It will be readily understood, however, that the number of subscribers' stations allotted to each auxiliary trunking station, and the number of trunk lines between the main and auxiliary trunking stations, can be varied in accordance with the requirements and the conditions of each particular case.

If the apparatus employed is of an automatic character, then, and as a matter of further and special improvement, each auxiliary trunking station will preferably consist of the necessary switching devices inclosed in an air-tight casing or inclosure. With a comparatively limited number of subscribers allotted to each auxiliary trunking station, it is obvious that the said air-tight casing or inclosure may be of comparatively small dimensions, as the apparatus necessary for making the connections between 100 subscribers' lines, for example, and 20 trunk lines, may evidently be brought within a comparatively small compass. Such being the case, these air-tight inclosures containing the switching devices, and constituting the auxiliary trunking stations, may be located in any convenient or out of the way place or locality. For example, in Figs. 2 and 3, the auxiliary trunking station J is located on top of a building, while another auxiliary trunking station K is located in an ordinary police box or signaling station; and the auxiliary trunking stations L are mounted on the upper ends of poles, while the auxiliary trunking station M is located in a man-hole below the surface of the ground. Fig. 4 illustrates more clearly the arrangement of one of the auxiliary trunking stations on the upper end of a pole, and in connection with a terminal ring $l$ to which the lines can be connected. On the other hand, Fig. 5 shows the arrangement of an auxiliary trunking station within a man-hole, and illustrates the cabling of the trunk lines $m$. In Figs. 6 and 7, a round or cylindrical form of casing is shown for inclosing the apparatus of the auxiliary trunking station. Such casing comprises a cylindric shell N, adapted to inclose the switching devices $n$, and hermetically sealed at its lower end by a base-plate $n^1$. Any suitable means may be employed for attaching the base-plate to the lower edge of said shell, and for effecting an air-tight joint or closure; and, if desired, the top of the shell may be provided with a ring $n^2$ for convenience in handling. Thus constructed, the interior of the casing or inclosure can be maintained at practically the same desired degree of temperature by means of an incandescent lamp $n^3$, or by any other suitable heating arrangement. This, it will be seen, prevents the apparatus thus inclosed from rusting or corroding, and insures at all times a proper working of the apparatus. In Fig. 8, the construction is practically the same as in the preceding views, except that the casing or inclosure is square rather than round.

The single diagram, comprising Figs. 9, 10 and 11, illustrates two auxiliary trunking stations connected with a main trunking station, and shows three subscribers' stations connected with each auxiliary trunking station. At the left of the diagram, in Fig. 9, are the subscribers' stations O, P and Q, while at the right of the diagram, Fig. 11, are the subscribers R, S and T. As will be observed, the first mentioned subscribers' stations are connected with the three "individual switches" U, V and W, which latter are, of course, located at the auxiliary trunking station; and it will also be seen that the three individual or private subscribers' lines are connected with the contacts of the three "connector-switches" X, Y and Z, the latter being also located at the said auxiliary trunking station and associated with said "individual switches". In a similar manner, the subscribers' stations at the right of the diagram are connected with three "individual switches" $U^1$, $V^1$ and $W^1$, which latter are located at another trunking station; the three individual or private lines leading to these three subscribers' stations are also connected with the contacts of the "connector-switches" $X^1$, $Y^1$ and $Z^1$. Fig. 10, it will be understood, represents diagrammatically the arrangement of trunk lines and automatic switching apparatus at the main trunking station—that is to say, the station through which all connections are made, assuming the system as a whole to involve the particular arrangement shown. Such being the case, the auxiliary trunking station shown in Fig. 9 is connected with the main trunking station through the medium of outgoing trunk lines $O^1$, and also by incoming trunk lines $P^1$; it being observed that the trunk lines $O^1$ terminate in the contacts of the "individual switches" U, V and W, while the trunk lines $P^1$ terminate in the relays and step-by-step apparatus of the "connector-switches" X, Y and Z. In a similar manner, the auxiliary trunking station shown in Fig. 11 is connected with the main trunking station by means of outgoing trunk lines $R^1$, and also by means of incoming trunk lines $S^1$; it being observed that the trunk lines $R^1$ terminate in the contacts of the "individual switches" $U^1$, $V^1$ and $W^1$, while the trunk lines $S^1$ terminate in the relays and step-by-step apparatus of the "connector-switches" $X^1$, $Y^1$ and $Z^1$. It is thus evident that the subscribers' lines or individual line connections $o$, $p$, $q$, and $r$, $s$, $t$, are normally disconnected from the trunk lines extending between the auxiliary trunking station and the main trunking station, and that the trunk lines are also normally disconnected from each other. In this way, each subscriber is connected with the main trunking station by means of normally disconnected line sections, whereof one is an individual line connection extending from the subscriber's station to the auxiliary trunking station, and the other a trunk-line connection extending between the auxiliary and main trunking stations and adapted to be used in common by all of the different subscribers connected with or allotted to the same auxiliary trunking station. It will also be seen, however, that each subscriber may use any one of a certain number of trunk lines for "calling out" or establishing connection with the main trunking station, and may be called up or receive a signal over any one of another set of trunk lines; the trunk lines over which selecting impulses and signals are transmitted from the auxiliary to the main trunking station being commonly known as out-going trunk lines, while those over which connecting impulses and signals are received at and transmitted through the auxiliary trunking station being commonly known as incoming trunk lines. As illustrated, the trunk lines $O^1$ are connected with the relays and step-by-step apparatus of the first "selector-switches" $O^2$, $O^3$ and $O^4$ at the main trunking station; while the trunk lines $R^1$ are connected with the relays and step-by-step apparatus of the first "selector-switches" $R^2$, $R^3$ and $R^4$ at the main trunking station. The trunk lines $P^1$ are connected with a certain level of contacts of the second "selector-switches" $Q^1$, $Q^2$, $Q^3$, $Q^4$, $Q^5$ and $Q^6$; the balance of the contacts of these second "selector-switches" being connected with the trunk lines $S^1$, as indicated. In addition, the contacts of the switches $O^2$, $O^3$, $O^4$, and $R^2$, $R^3$ and $R^4$ are connected with the relays and step-by-step apparatus of the switches $Q^1$, $Q^2$, $Q^3$, $Q^4$, $Q^5$ and $Q^6$ by means of local trunk lines $O^5$. At the subscribers' stations, it is evident that the switching or circuit-opening and closing devices by which the subscriber is enabled to transmit the necessary impulses over the line circuits may be of any suitable, known or approved character; but in the drawings, and as a simple way of illustrating the operation of an automatic telephone or signaling system, I have shown each subscriber's equipment as including a pair of simple key-switches, and also the usual hook-switch. In the arrangement shown, there is an "individual switch" for each subscriber's line; but it will be readily understood that the number of "connector-switches" at each auxiliary trunking station may be considerably less, it being a matter of common knowledge that in a system of this character the number of "connector-switches" may, for example, be substantially ten per cent. of the number of subscribers. Also, as previously explained, the number of trunk lines extending from any auxiliary trunking station may be considerably less than the number of subscribers' lines radiating therefrom. For this reason, the illustration in the diagram of more trunk lines and more "connector-switches" than are really necessary in taking care of the number of subscribers shown will be readily understood. The individual switches in the system herein described are switches which respond to impulses from the telephone, which do not correspond with the directory numbers of the subscribers. These switches are in the nature of auxiliary trunk selectors and are non-numerical in character, that is, they do not perform any group electing operations. Group electing operations are necessarily numerical in character, whereas the operations that automatically select an idle trunk out of a number which run to a particular group are in the nature of non-numerical operations. Some switches combine in them both numerical and non-numerical operations, such as the first selector shown in Fig. 12. The numerical operation is the operation that carries the wipers from one level to another, whereas the non-numerical operation is the operation that results in the finding of an idle trunk in a particular level. The switches which are individual to the subscribers in this system are, therefore, switches which perform only non-numerical operations and are called non-numerical switches.

The operation of the system as a whole, and the arrangement of the different devices, will, however, be clearly understood by considering, in a general way, the various successive operations and circuit connections which necessarily take place in the automatic connection of one subscriber's line with another. Suppose, therefore, that a subscriber at station O desires to communicate with a subscriber at station R. In such case, the subscriber at station O simply removes the receiver 1 from the usual switch-hook 2, thereby causing cam 37 on the said hook to momentarily engage the grounded contact 3, and thus momentarily connect the line wire 4 with the ground at 5. (See Figs. 15 and 16.) This, it will be seen, closes a circuit from ground 5 through springs 43, contact 3 and the cam 37, over the line conductor 4, through the apparatus of "individual switch" U, then through the battery 5ª, and from the ground connection 6 back to the ground connection 5. The completion of a circuit in this manner, actuates the "individual switch" U in the manner well understood, causing the wiper-contacts 7 to engage the bank-contacts 8, providing, of course, that the trunk line with which the contacts 8 are connected is idle; it being a matter of common knowledge, by those skilled in the art, that in a switch of this character the said wiper-contacts simply move around and over the bank-contacts until they come into engagement with a pair of bank-contacts which are connected with an idle trunk line—that is to say, the wiper-contacts, by reason of a well-known provision, cannot stop on the contacts which are connected with trunk lines in use, owing to the presence of guarding potential thereon. As soon as connection is thus automatically established with the trunk line 9, which latter connects with the "first selector-switch" O² at the main trunking station, the subscriber at station O then presses the key 10—only once—so as to close a ground circuit from the ground at station O over the line wire 11, over one side of the trunk line 9, then through the apparatus of the first "selector-switch" O², and finally through the battery 12 to ground. In this way, the switch-shaft of the first "selector-switch" O² is caused to make one vertical step; and the subscriber at station O then presses the key 13 for the purpose of completing another ground circuit through the apparatus of switch O², this last circuit including the line wire 4 and the other side of the trunk line 9, and also including the battery 12. In this way, the switch-shaft of the first "selector-switch" O² is caused to rotate and thereby connect the wiper-contacts 14 with a pair of the bank-contacts 15. The manner in which this switch O² establishes the connection with the trunk line 16 will also be readily understood; and in fact, the mode of operation of automatic switches of the character indicated by the diagrams will be readily understood by those skilled in the art; and inasmuch as the character or mode of operation of the step-by-step and other mechanism of the different switches is unimportant, so far as an understanding of my invention is concerned, the details and construction of these switches need not be considered at present. When connection has thus been established between subscriber's station O and the first "selector-switch" O², and thereafter with the trunk line 16, the subscriber at station O then presses the key 10 in such manner as to close a circuit over the connected trunk lines twice, thereby causing the shaft of the second "selector-switch" Q¹ of the main trunking station to step up two points. After this, subscriber at station O presses the key 13, thereby causing the shaft of switch Q¹ to rotate and connect the wiper-contacts 17 with the bank-contacts 18 in the second row, which are connected with the trunk line 19. This trunk line 19, it will be seen, leads from the main trunking station to the auxiliary trunking station at which it is connected to the "connector-switch" $X^1$; and such being the case, the subscriber at station O can now press the key 10 once, and thereby cause the shaft of switch $X^1$ to move upward one point. After the vertical impulse the key 13 is pressed once, thereby grounding the rotary line conductor 4 and permitting the side switch of the connector switch $X'$ to pass to second position. The vertical key 10 is then pressed and the switch shaft of the switch $X^1$ is rotated one step each time the key 10 is pressed. This brings the wiper-contacts 20 into engagement with a pair of the bank-contacts 21. The calling subscriber finally presses the key 13 once, and the final impulse thus sent over the connection allows the "side-wipers" of the "connector-switch" to move to third position, thus completing the connection from the calling telephone line through to the contacts 21, and as these contacts 21 are connected with the local wires 22, which latter connect with the line wires $r$, it is evident that the subscriber's apparatus at station O is now electrically connected with the subscriber's apparatus at station R, provided the called subscriber's line is not already in use. If the called subscriber's line is busy, then the said "connector-switch," by reason of a well-known provision, will fail to make the connection, and will instantly release and remain in its "busy-signal" condition until the calling subscriber gives up the attempt to get the desired connection; and it will be understood, of course, that the calling subscriber, in hanging up the receiver after getting the "busy" signal, thereby effects, through any well-known or suitable releasing arrangement, a restoration of all of the switches which were employed in establishing, or attempting to establish, connection through to the called subscriber's line. The current for operating the switch $Q^1$ is furnished by a local battery 23, while the current for operating the switch $X^1$ is furnished by the local battery 24. When connection has thus been automatically established between the two subscribers' stations, the subscriber at station O can then employ any suitable signaling arrangement for attracting the attention of subscriber at station R. Also, it is obvious, that after the automatic establishment of electrical connection between the two subscribers' stations, the two subscribers can then converse by means of any suitable form of telephone apparatus. In the foregoing manner, connections can be established between subscribers whose lines terminate at different auxiliary trunking stations; and in all such cases, it is evident that the connection between the two subscribers' stations will include at least two trunk lines. But suppose now that the subscriber at station O desires to communicate with subscriber at station P, it being observed that the individual or private line connections of these two subscribers' stations terminate at the same auxiliary trunking station. In a case of this kind, the connection between the two subscribers' lines is preferably, as in all other cases, established through the medium of the main trunking station—that is to say, the subscriber at station O first automatically connects his line with one of the outgoing trunk lines $O^1$, and then, by suitable manipulation of his switching apparatus, connects the out-going trunk line with one of the return or incoming trunk lines $P^1$. After this, the final step in the establishment of connection between the two subscribers' lines is accomplished by connecting the selected trunk line $P^1$, through the medium of the "connector-switch" X, for example, with the local wires 25, which latter are connected with the limbs or line wires $p$ leading to the subscriber's station P. In other words, this connection can be made in a manner similar to the one previously described, but with the exception that a connector-switch at the same auxiliary trunking station is employed, rather than one at a second or distant auxiliary trunking station. That this is true, is perfectly obvious; for in connecting subscriber's station O with subscriber's station P, the first step consists in operating the "individual switch" U, and thereby connecting the subscriber's line $o$ with trunk line 9, providing, of course, that the latter is idle. After this, the switch $O^2$ at the main trunking station can be manipulated or operated for the purpose of extending the connection therefrom to one of the local trunk lines $O^5$. If the trunk line 16 is idle and available at such time, the switch $O^2$ will establish connection between this trunk line and the outgoing trunk line 9. The next step then consists in manipulating or operating the second "selector-switch" $Q^1$ in such manner as to establish connection with one of the incoming or return trunk lines $P^1$; and if the trunk line 26 is not busy, it is evident that this particular trunk line will be the one automatically selected by switch $Q^1$ to do the required work. Finally, the "connector-switch" X is manipulated in such manner as to bring the wiper-contacts 27 of this switch into engagement with a pair of the bank-contacts 28, the latter being connected with the local wires 25 leading to the line wires $p$. In operating the switch X for the purpose of making the said connection, it will be understood that, with the particular type of switch indicated, it will be necessary to first manipulate the keys at subscriber's station O in such manner as to cause the switch-shaft to move upward one point. When this has been done, the said shaft is then caused to rotate until it engages the bank-contacts 28. In this way, as explained, all connections either between subscribers' lines terminating at the same or different auxiliary trunking stations, are established through the medium of the main trunking station. In every case, therefore, when two subscribers converse, the talking circuit includes two individual or private line connections, an out-going and an incoming trunk line, and also a local trunk line at the main trunking station. This, obviously, results in a decided economy with respect to the amount of copper required—that is to say, the amount of wiring or cabling necessary between stations; and that a material or decided reduction in the amount of cabling or wiring necessary between stations, even though it might necessitate a somewhat greater amount of switchboard apparatus than would be the case if all of the subscribers' stations were provided with private or individual lines leading directly to a main or central station, is an advantage, is evident when it is taken into account that the wiring or cabling between stations is usually the more costly part of a system, not only with respect to installation, but also in regard to the maintenance of the system. So that with a given number of subscribers, even though the arrangement may require a somewhat greater amount of switchboard apparatus, it is perfectly clear that, by my invention, I accomplish a material reduction in the amount of copper or wiring necessary for giving good service to such a number of subscribers, and thereby provide a signaling or telephone system which is, on the whole, much more economical to establish and maintain in good working order.

It is also evident that, in a system embodying the principles of my invention, a further advantage resides in the fact that the auxiliary trunking stations can be comparatively small, and can be located in any convenient or out-of-the-way place, providing, of course, that the apparatus is of an automatic character. In such case, it will also be seen that the interior of each casing or inclosure can be heated in any simple or convenient manner, but preferably by means of an incandescent lamp, or some other suitable heat-generating resistance; and at this juncture it may be stated that good results can be obtained by making the outside of the casing or inclosure of metal, and the inside of wood. Furthermore, in an automatic exchange system of the foregoing character, it is obvious that an important feature, and a matter of special consideration, is the manner in which the final step is accomplished in an automatic connection of one subscriber's line with another; for in an automatic exchange in which the well-known "decimal system" is employed, it will be seen that, by my improved arrangement, the last two decimals or digits of the number called are made at an auxiliary trunking station which is more or less remote from the main or central station, and which may be either the same or a different auxiliary trunking station from the one at which the call originated. While my improved exchange system is adapted to materially reduce the cost of the line construction necessary for a given number of subscribers, it will be seen that an even greater economy results from the operation of a system of this character; and it may be stated, in this connection, that I do not limit myself to any particular number of trunk lines, nor to any particular number of main or auxiliary trunking stations. Furthermore, I do not limit myself to any particular number of subscribers' stations for each auxiliary trunking station, nor to any particular place or manner of locating the auxiliary trunking stations. It has already been stated that I do not limit myself to any particular type or character of switchboard apparatus, nor to any particular kind of switching devices at the subscribers' stations for manipulating whatever type of automatic switching apparatus may be employed at the main or auxiliary trunking stations. Again, I do not limit myself to any particular number of switching devices which a subscriber must manipulate at the main trunking station in order to accomplish the desired circuit connection.

While, for convenience of illustration, separate batteries have been shown associated with the different switches, it is evident that one battery could be employed at each station, or that any other arrangement or distribution of the source of current may be employed, as desired. Furthermore, it is evident that other arrangements and combinations of the switches may be employed; but in an automatic system, and as a matter of simplifying the construction and mode of operation, I find it desirable to employ "connector-switches" at the auxiliary trunking stations for making the last two decimals—that is to say, the last two digits—of the number called for. With such an arrangement, the last two decimals or digits of any number called for are always made either at a distant or the same auxiliary trunking station from the one at which the call originates, and not at the main trunking station. Consequently, with the arrangement shown, the last two decimals or digits of the number called for are always made by the connector-switch at one of the auxiliary trunking stations, while all the preceding decimals or digits of such number are made by the automatic switching devices at the main or central trunking station. This arrangement is desirable, I find, for various reasons; and for example, it is obviously of advantage to impose as much of the work as is possible upon the apparatus of the main or central trunking station, so as to reduce the amount of work to be performed by the apparatus at the auxiliary trunking stations to a minimum. As previously explained, it is found to be of considerable advantage, and a very satisfactory arrangement, to reduce the auxiliary trunking station apparatus to as small a compass as possible, so as to permit these small auxiliary trunking stations to be conveniently disposed in out-of-the-way places. This I find can be readily and very nicely accomplished by limiting the connector-switches at the auxiliary trunking stations to a particular amount of work—to-wit, the work or operations necessary in making the last two decimals or digits of a number called for. By thus imposing this exact amount of work—no more no less—upon the apparatus at the auxiliary trunking stations, I find that less apparatus is necessary at these auxiliary stations than would be the case should either a greater or less number of decimals or digits of the called-for number be made at such place. So, for this reason, I prefer, as explained, to reduce the amount of apparatus necessary at the auxiliary stations to a minimum, and to use a suitable amount of apparatus at the main or central trunking station; the most important object of my invention, as previously explained, being to reduce the cost of installation and maintenance at all points outside of the central station. It will be understood, however, that I do not limit myself to this exact construction and mode of operation.

It will also be seen that the automatic connection of the calling-subscriber's line with an idle trunk line before any operation corresponding to the first digit of the called number is performed, constitutes a feature of special and further improvement. This, of course, as previously explained, can be done in any suitable manner; but as a simple and efficient arrangement, and as a matter of special improvement, the single impulse necessary for actuating the "individual switch" connected with the calling-subscriber's line is transmitted over such line by the momentary closing of a grounded circuit when the calling-subscriber removes his receiver from the switch-hook. In this way, the selection of the first trunk line is not only automatic in the sense that no switchboard operator is necessary, but also in the sense that it is necessarily incident to the removal of the receiver from the switch-hook.

With the arrangement shown, it will be readily seen that the "individual switches" at the auxiliary trunking stations are only given a rotary movement, at one level—inasmuch as only ten trunk lines are connected with each "selector-switch". It will be understood, however, that, should a greater number of trunk lines be connected with each "individual switch" at the auxiliary trunking stations, any suitable arrangement or mode of operation involving a vertical movement of such switches, from one bank level to another, can then be employed. Furthermore, in this connection, it will be seen that these "individual switches" at the auxiliary trunking stations are not operated by the impulses employed in forming the number called for, but are operated simply by a preliminary impulse transmitted over the circuit for the purpose of automatically establishing connection between a calling-subscriber's line and an idle trunk line; and this is all accomplished by the calling-subscriber, in any suitable manner, preliminary to the transmission of the current or different impulses representing the different decimals or digits of the number called for. In this way, the switches U, V, W, and $U^1$, $V^1$, $W^1$, which may, for convenience, be termed the "individual switches" of the system, are employed in making preliminary connections, and are not disturbed by the current used in calling or forming the number of the desired subscriber's station. As previously explained, it is obvious that any suitable means may be employed at the subscribers' stations for operating the said "individual switches", it being possible, of course, to accomplish this preliminary connecting operation in various ways. It will also be seen, at this juncture, that the feature of automatically connecting any one of a group of subscribers with a trunk line which leads to the central station, and which is used in common by the subscribers of that group, can be employed in connection with any suitable switchboard or exchange apparatus at the central station. In other words, the feature of trunking between groups of subscribers and the central station is obviously an advantageous one, regardless of whether the apparatus at the central station be automatic or manual in character.

The switches U, V, W and $U^1$, $V^1$, $W^1$ are called "individual switches", inasmuch as each one is allotted solely to the use of a single subscriber. These switches are also called "individual switches" in order to distinguish them from the well-known and so-called, previously described, first and second "selectors", and from the said "connectors". In practice, a first "selector" is any switch which receives the impulse or impulses representing the first decimal or digit of the called number, while the second "selector" is any switch which receives and is operated by the impulse or impulses representing the second decimal or digit of the called number; or at least the terms first and second "selectors" are employed to designate switches which receive and are operated by an impulse or impulses representing one or more digits of the called number. Consequently, the said individual switches may be the same in number as the number of subscribers, while the first and second "selectors" and "connectors", and any other similar switches, can all be installed on a percentage basis. In this way, the number of first "selectors" is materially reduced, it having been the practice, prior to my invention, to employ as many so-called first "selectors"—that is, switches operated by the first impulse or impulses sent over the line in calling the number of the desired subscriber—as there were subscribers' lines terminating at the exchange or central station. As stated, however, the employment of individual switches, which have no other function than to receive the impulse or impulses sent over the line preliminary to calling the desired number, permits the number of first "selectors" to be reduced to a percentage basis—that is to say, to ten per cent., for example, of the total number of subscribers. Each "individual switch", when operated by its allotted subscriber, automatically picks out an idle or non-busy first "selector". In this way, the first "selector" is connected with the calling subscriber's line, and is in readiness for use, by the time the calling subscriber is ready to begin calling the number of the desired subscriber.

It is obvious that any suitable arrangement can be employed at the subscribers' stations, and in the different automatic switches throughout the exchange, for releasing or restoring all of the different switches after the conversation is terminated. For example, it is the practice in certain automatic systems now in use, and of the character herein described and illustrated, to so arrange the apparatus that the act of replacing the receiver at the subscriber's station serves to momentarily ground the subscriber's line, and thereby bring about the operation of releasing circuits and devices at the different switches, resulting in the restoration of the different step-by-step switching mechanisms employed by the calling subscriber in securing connection with the called subscriber's line. It is obvious that the construction and circuit arrangement shown and described may include a releasing arrangement of this or any other suitable character.

Also, the means whereby any trunk-line, or subscriber's line, while in use, is made busy, so to speak, so that a third subscriber can not establish connection with either one of the two subscribers who are already conversing, nor with any of the trunk-lines which the two subscribers are using, may be of any suitable, known or approved character. In a similar way, the mechanical and electrical arrangements whereby the "individual switches", and also the first and second "selectors", are each adapted to rotate automatically until an idle trunk-line is selected, may be of the usual or any other suitable or desired character. And for like reasons, the construction and arrangement whereby the different "connectors" are each adapted to rotate only in accordance with the impulses which the calling subscriber sends over the line-circuit, corresponding to the last two digits of the called number, may be of any known or suitable character.

As previously stated, the construction of the different automatic switches may be of any suitable, known or approved character. For example, each of the said "individual-switches" may be of the general construction and character shown in Fig. 12. In this figure, which is an enlargement of the "individual-switch" U, for example, the circuit arrangement or electrical construction is quite fully illustrated, while only so much of the mechanical construction is shown as is necessary to understand the operation, and to identify the general type of switch. In this figure, the step-by-step mechanism and other mechanical parts, together with the operating magnets, are shown in perspective, while the relays are shown in side elevation; and it will be understood that the framework for supporting the various elements may be of any suitable or desired character, but is omitted for convenience of illustration. The construction includes the usual switch-shaft $u$ provided at its lower end portion with the "private-wiper" $u^1$ and with the "vertical" and "rotary" wipers $u^2$ and $u^3$, all insulated from each other and from the shaft. The wiper $u^1$ is adapted to engage any one of the ten contacts in the "private-bank" $u^4$, while the said "vertical" and "rotary" "line-wipers" are adapted to engage any one of the ten pairs of contacts in the "line-bank" $u^5$. The "vertical" and "rotary" line-trunk-conductors $u^6$ and $u^7$ lead to a first "selector," it being understood that each pair of contacts included in the line-bank are connected with a trunk-line leading to a first "selector." Each contact in the "private-bank" $u^4$ is connected, as, for example by means of a "private-multiple" $u^8$, with a corresponding "private-bank-contact" in each of the other "individual-switches" belonging to the subscribers in this particular group—that is to say, all "private-bank-contacts" allotted to a certain trunk-line leading from this group are multipled together; and it will also be understood that all "vertical" and "rotary" line-contacts allotted to any particular trunk-line are multipled together throughout the different "individual-switches." In this way, each terminal in the "private-bank" $u^4$ consists of a single contact adapted to be engaged by the "private-wiper" $u^1$, while each terminal in the line-bank $u^5$ consists of a pair of contacts connected to opposite sides of a trunk-line adapted to be engaged respectively by the wipers $u^2$ and $u^3$—that is, when the switch-shaft is operated by the step-by-step mechanism. At its upper end the said shaft is provided with a clock-spring device $u^9$ for maintaining said shaft in its normal position, and for restoring the same when finally released from any position into which it may have been thrown for the purpose of making the desired connection. This spring keeps the normal post arm $u^{10}$ pressed normally against the normal post $u^{11}$, said arm being secured to the shaft; and the means thus provided act as a stop device for limiting the back rotation of the shaft. Intermediate of its upper and lower ends, the said shaft is provided with vertical ratchet-teeth $u^{12}$ and also with rotary ratchet-teeth $u^{13}$; and also with a cam $u^{14}$. The said vertical ratchet-teeth are provided with a longitudinal groove or channel $u^{15}$ adapted to be normally engaged by a supporting-dog or arm $u^{16}$. With this arrangement, the shaft can only move up and down when the hook-shaped stationary dog $u^{16}$ is in engagement with the said groove or channel; but when the shaft revolves, then the said dog or hook $u^{16}$ engages underneath one of the teeth $u^{12}$ so as to support the shaft in its elevated position while the means for rotating the shaft are being operated. When the calling subscriber momentarily grounds the line-conductor 4, in the manner previously described, a circuit is completed from ground through the "rotary-relay" $u^{17}$ to the non-grounded pole of the battery $5^a$. The energizing of this relay closes a circuit from ground $u^{18}$ through the normally-separated relay-springs $u^{19}$, through the normally-closed contacts $u^{20}$ and $u^{21}$, through the "side-switch-arm" $u^{22}$ and its contact $u^{23}$, through the "vertical-magnet" $u^{24}$, and thence to the non-grounded pole of the battery. Also, the energizing of the said "rotary-relay" closes a circuit from ground through the "private-magnet" $u^{25}$ to the non-grounded pole of the battery. The said "vertical-magnet" $u^{24}$ is provided with an armature $u^{26}$ adapted to be pivotally mounted at $u^{27}$, and having an arm $u^{28}$; and the said arm is provided with a lug $u^{29}$, and with a spring-pressed ratchet-dog $u^{30}$ adapted to engage the vertical ratchet-teeth $u^{12}$. The locking-dogs $u^{31}$ and $u^{32}$ are adapted to engage the vertical and rotary ratchet-teeth, respectively, and are rigidly connected and adapted to be pivotally mounted at $u^{33}$. Normally, the arm $u^{28}$ is subject to the tension of a spring $u^{34}$ which keeps the armature normally away from the "vertical-magnet." A spring $u^{35}$ tends to remove the two locking-dogs toward their respective ratchet-teeth. The arm $u^{36}$ is rigid with the two locking-dogs, and this is also true of the catch or locking-projection $u^{37}$. Normally, the armature $u^{38}$ of the "release-magnet" $u^{39}$ is held in its retracted position by a spring $u^{40}$. This armature is provided with a link or arm $u^{41}$ having an opening at its end adapted to normally engage the locking-projection $u^{37}$; and in this way the spring $u^{40}$ normally holds the two locking-dogs out of engagement with their respective ratchet-teeth. As the armature $u^{26}$ rises, however, the lug $u^{29}$ lifts the arm or link $u^{41}$ out of engagement with the projection $u^{37}$, and thereby allows the two locking-dogs to be drawn into engagement with the ratchet-teeth. At the same time, the ratchet-dog $u^{30}$ engages one of the ratchet-teeth $u^{12}$—this dog being guided into and out of engagement with the ratchet-teeth by suitable means—and in so doing raises the shaft one step. The energizing of the "private-magnet" $u^{25}$ causes it to attract its armature $u^{42}$ the latter being provided with an arm $u^{43}$ and controlled by a spring $u^{44}$ which holds said armature normally away from the said magnet. This arm $u^{43}$ is provided with a couple of flexible springs $u^{45}$ and $u^{46}$, the same being provided at their inner portions with opposing ratchet-teeth $u^{47}$ and $u^{48}$. As soon as the preliminary impulse contact is broken at the calling subscriber's telephone, the "side-switch-arms" $u^{22}$, $u^{49}$, $u^{50}$, $u^{51}$ and $u^{52}$ are released and allowed to move to the second position, for this reason: The said "side-switch-arms" are all practically connected and mounted upon a support or body $u^{53}$, the latter being pivoted at $u^{54}$ and subject at all times to the action of the spring $u^{55}$. This support or body is provided with a finger $u^{56}$ which normally occupies the position shown in Fig. 12—that is to say, between the springs $u^{45}$ and $u^{46}$, and in engagement with the first or inner tooth $u^{47}$. When the "private-magnet" is energized, the inner tooth $u^{48}$ is then brought into engagement with the finger $u^{56}$; but when the "private-magnet" is deënergized, then the finger $u^{56}$ owing to the relative arrangement of the ratchet-teeth on these two springs, is permitted to escape and engage the second or outer tooth $u^{47}$; and this outward movement of the finger $u^{56}$ is limited by reason of the engagement of the lug $u^{57}$, which is carried by the support or body $u^{53}$, with the said cam $u^{14}$. The shifting of the "side-switch" from first to second position in this manner closes a circuit from ground at $u^{58}$ through the contact $u^{59}$, through the "side-switch-arm" $u^{49}$, through the "rotary-magnet" $u^{60}$, through the normally-closed interrupter-contacts $u^{61}$, and thence to the non-grounded pole of the battery. In addition, the shifting of the "side-switch" to second position opens the previously described circuit through the "vertical-magnet" $u^{24}$; and at this time it will also be seen that the "private-wiper" $u^1$ is connected through the "side-switch-arm $u^{50}$ and the contact $u^{62}$ with suitable conductors leading to the "private-magnet" $u^{25}$, thus connecting the "private-magnet" in series between the "private-wiper" and the non-grounded pole of the battery. The closing of the circuit through the "rotary-magnet" $u^{60}$ causes it to attract its armature $u^{63}$, which armature is provided with an arm $u^{64}$ having a spring-pressed ratchet-dog $u^{65}$; with an arm $u^{66}$ adapted to open and close the contacts $u^{61}$; and with a third arm $u^{67}$ adapted to engage the armature $u^{42}$ of the "private-magnet." This armature $u^{63}$ is normally held away from its magnet by a spring $u^{68}$, and is adapted to be pivoted or swingingly mounted at $u^{69}$. At this juncture it may be stated that all the said armatures are adapted to be pivotally or swingingly mounted so as to swing toward and away from their respective magnets. Consequently, the armature $u^{63}$, when attracted by its "rotary-magnet," causes the ratchet-dog $u^{65}$ to engage one of the ratchet-teeth $u^{13}$, and to thereby rotate the shaft one step; it being understood that the single vertical step of the shaft was sufficient to raise the wipers $u^1$, $u^2$ and $u^3$ to the level of the bank-contacts, and that the single rotary step of the shaft is sufficient to then bring the wiper $u^1$ into engagement with the first contact in the "private-bank" $u^4$, and the wipers $u^2$ and $u^3$ into engagement with the first terminal or set of contacts in the bank $u^5$. In addition, and if these first contacts in the said banks are not busy—that is, not connected with a trunk-line already in use—the "private-magnet" $u^{25}$ will not be energized, but its armature $u^{42}$ will be actuated by the arm $u^{67}$. At the same time, the "rotary-magnet" in attracting its armature opens up the contacts $u^{61}$, which latter, it will be remembered, are in the energizing circuit of the said "rotary-magnet"; and with this arrangement the "rotary-magnet" attracts its armature and then, by reason of having broken its own circuit, instantly releases the said armature. This action, it will be seen, serves to again operate the "private-magnet" armature-arm in the manner previously explained—that is to say, the effect is substantially the same as though the "private-magnet" had been energized and then deënergized. When this is done, the "side-switch-finger" $u^{56}$ is, of course, again released and permitted to move, under the influence of the spring $u^{55}$, into engagement with the stationary stop $u^{70}$. Thus operated for the second time, the said "side-switch-arms" are caused to move to third position, thus connecting the "private-wiper" $u^1$, through the medium of the "side-switch-arm" $u^{50}$ and the contact $u^{71}$, with ground at $u^{72}$. The movement of the "side-switch" in this way also connects the "vertical-line-wipers" $u^2$ with the line-conductor 11, through the medium of the "side-switch-arm" $u^{51}$ and the contact $u^{73}$; and in a similar way the "rotary-line-wiper" $u^3$ is connected, through the medium of the "side-switch-arm" $u^{52}$ and the contact $u^{74}$, with the subscriber's line-conductor 4; and in this way the terminal 8, which is connected with the trunk-line 9, is brought into electrical connection with the subscriber's line. The shifting of the "side-switch" to third position stops the flow of current through the "rotary-magnet" $u^{60}$, thus leaving the shaft in a position to permit the wipers to engage the first terminals in the two rows of bank-contacts. The wiper $u^1$, when brought into engagement with the first contact in the "private-bank" $u^4$, connects all of the multiples of this contact, in the other "selector-switches", with the grounded pole of the battery $5^a$, and thus establishes a guarding potential at these contacts, so as to prevent seizure of this same trunk-line by some other calling subscriber. Suppose, however, that the first contacts in these single rows of bank-contacts should be busy: In such case, the momentary flow of current from the grounded pole of the battery through the "private-wiper" $u^1$, and through the "side-switch-arm" $u^{50}$ and the contact $u^{62}$ (it being remembered that at this time the "side-switch" is in second position), and thence through the "private-magnet" $u^{25}$ to the non-grounded pole of the battery, will keep the said magnet energized. Obviously, the "rotary-magnet" $u^{60}$ must remain energized, at least intermittently, as long as the "side-switch" remains in second position, and the "private-magnet" must remain energized as long as the "side-switch" remains in second position, and as long as the "private-wiper" $u^1$ continues to engage a busy contact—that is, a contact at which there is a guarding potential by reason of its being connected with a multiple-contact which is in engagement with the "private-wiper" of some other "individual-switch". Such being the case, the "side-switch" will remain in second position, and the "rotary-magnet" $u^{60}$ will continue to attract and release its armature, until the "private-wiper" $u^1$ finds a non-busy contact. As soon as this happens, the "private-magnet" $u^{25}$ is deënergized, and the "side-switch" is allowed to escape and assume the third position, and so as to open the grounded circuit including the "rotary-magnet" and the "side-switch-arm" $u^{40}$. In other words, the rotary step-by-step mechanism is automatically retained in operation by the engagement of the "private-wiper" $u^1$ with busy contacts, and the rotation of the shaft thus proceeds automatically until the shaft-wipers find a set of contacts corresponding to an idle or non-busy trunk-line. As stated, the means for supporting the various operative parts can be of any suitable character, and the guides for directing the ratchet-dogs into and out of engagement with their ratchet-teeth can be of the usual and well-known form.

The calling subscriber, by simply taking down his receiver, having thus automatically connected his line with an idle trunk-line, and consequently with an idle first "selector", the next step in the general operation of getting connection with the called subscriber's line consists in properly actuating the first "selector-switch" shown in Fig. 13. As previously explained, it may be assumed that the calling subscriber is calling another subscriber whose number is 1211; and in such case, the calling subscriber first sends a single impulse by means of the key 10, so as to complete a grounded circuit including the "vertical-line-relay" $o^1$ and the battery 12. This relay, when thus energized, closes a local circuit from the non-grounded pole of the battery through the "vertical-magnet" $o^2$, through the "side-switch-contact" $o^3$ and the "side-switch-arm" $o^4$, through the "private-magnet-switch-springs" $o^5$ and $o^6$, and thence through the "vertical-relay-springs" $o^7$ and $o^8$ to ground at $o^9$, and back to battery. The said "vertical-magnet" $o^2$ is provided with a pivotally-mounted or swinging armature $o^{10}$, which armature is provided with an arm $o^{11}$ carrying a lug $o^{12}$ and a pivoted spring-pressed ratchet-dog $o^{13}$; and this armature $o^{10}$ is held normally away from its magnet by the spring $o^{14}$. In this case, the switching mechanism includes a shaft $o^{15}$ provided at its lower end with a "private-wiper" $o^{16}$, and with "vertical" and "rotary" line-wipers $o^{17}$ and $o^{18}$. The "private-wiper" $o^{16}$ is adapted to engage the contacts in the "private-bank" $o^{19}$, while the other two wipers are adapted to engage the pairs of contacts in the line-bank $o^{20}$. In these two banks, each horizontal row (there are ten rows) includes ten terminals; but in the "private-bank" each terminal consists of a single contact, while in the line-bank each terminal consists of two contacts connected respectively with opposite sides of the trunk-line leading to a second "selector". In this way, each first "selector" is preferably provided with ten levels of bank-contacts, each level containing ten sets of contacts. Consequently, the said shaft is adapted to rise to any one of ten levels, and is also adapted to then assume any one of the ten positions allotted to each level, there being one hundred trunk-lines connected with the line-bank of each first "selector". As in the case of the "individual-switches", each contact in the "private-bank" $o^{19}$ is multipled or connected with all of the other contacts which are allotted to the same trunk-line in other first "selectors" of this particular group. It may be stated at this juncture that the general construction and mode of operation of a first "selector" is quite similar to that of an "individual-switch", the mechanical construction being practically the same in each case, and only the relays, contacts and circuits being different in the two kinds of switches. Like the "individual-switch", this first "selector" shown in Fig. 13 has its shaft provided with vertical ratchet-teeth $o^{21}$ and with rotary ratchet-teeth $o^{22}$, together with a cam $o^{23}$. The upper end of the shaft is also provided with a clock-spring device $o^{24}$ for restoring it to its normal position, and with the normal post arm $o^{25}$ adapted to normally engage the normal post $o^{26}$. Unlike the "individual-switch", however, this normal post arm is adapted to normally engage a switch-spring $o^{27}$, so as to prevent the latter from normally engaging the contact $o^{28}$, the latter being grounded at $o^{29}$. The ratchet-teeth $o^{21}$ have the previously described vertical groove or channel $o^{30}$ which is normally engaged by the dog or hook $o^{31}$. In this way, the shaft $o^{15}$ can only move up and down when the said dog or hook engages the groove $o^{30}$. When the shaft revolves, then this hook-shaped element $o^{31}$ engages underneath the ratchet-tooth corresponding to the level to which the shaft is raised, and t' :s . ports the shaft in its rotary step-b :ep ovements. The locking-dogs $o^{32}$ and ³ a1 normally out of engagement with the vertical and rotary ratchet-teeth, but are rigidly connected together and adapted to engage the said teeth while the switch is in use. The locking-dogs are adapted to be pivoted at $o^{34}$, and are provided with a downwardly-extending arm $o^{35}$, and with an upwardly-extending projection $o^{36}$. The "release-magnet" $o^{37}$ is provided with a pivotally-mounted or swinging armature $o^{38}$ which carries a horizontally-disposed locking-arm or link $o^{39}$, the same being provided at its end with an aperture adapted to normally engage the projection or catch $o^{36}$. A spring $o^{40}$, applied to the armature $o^{38}$, keeps the latter normally retracted, and also serves to keep the two locking-dogs normally out of engagement with their respective ratchet-teeth. When the calling subscriber calls the first digit of the desired number, he presses the key 10 but once, as stated, so as to send a single impulse over a grounded circuit including the so-called "vertical-line-conductors" and also including the battery 12 and the "vertical-relay" $o^1$. This, as explained, closes the local circuit including the "vertical-magnet" $o^2$, causing the latter to attract its armature $o^{10}$, and the said armature, when thus lifted from its normal position, causes the lug $o^{12}$ to lift the arm $o^{39}$ out of engagement with the projection $o^{36}$, and also causes the ratchet-dog or actuating-pawl $o^{13}$ to engage one of the ratchet-teeth $o^{21}$. In this way, the shaft is lifted one step, and at the same time the said locking-dogs $o^{32}$ and $o^{33}$ are released and allowed, under the influence of their spring $o^{41}$, to engage the said vertical and rotary ratchet-teeth carried by the shaft. This one vertical step of the shaft $o^{15}$ brings the wipers $o^{16}$, $o^{17}$ and $o^{18}$ into the plane of the first level of the two banks, but not into engagement with any of the contacts thereof. After this the calling subscriber then presses the key 13 once, so as to close a grounded circuit including the so-called "rotary-line-conductors", and also including the "rotary-relay" $o^{42}$ and the battery 12. This so-called "rotary-relay", when thus energized, attracts its armature and thereby brings the spring $o^{43}$ into electrical contact or connection with the intermediate spring $o^8$. In this way, another local circuit is closed including the battery 12 and its ground connection $o^9$, the springs $o^8$ and $o^{43}$, the "private-magnet" $o^{44}$, and the conductors extending between this magnet and the non-grounded pole of the battery. As shown, the said "private-magnet" is provided with a pivoted or swinging armature $o^{45}$, the latter having a horizontally-disposed arm $o^{46}$; and this arm, it will be seen, is provided with a couple of flat springs $o^{47}$ and $o^{48}$. Normally, the armature $o^{45}$ is held away from its magnet by a spring $o^{49}$. Furthermore, this armature-arm is provided with a lateral switch-finger $o^{50}$ adapted to operate the switch-springs $o^5$, $o^6$ and $o^{51}$. At its end, the armature-arm of the "private-magnet" is provided with upper and lower oppositely-arranged ratchet-teeth $o^{52}$ and $o^{53}$, preferably made integral with the said flat springs. When the switch is in its normal condition, the finger $o^{54}$ of the "side-switch" $o^{55}$ projects between the two flat springs, as shown in Fig. 1", and in engagement with the inner tooth $o^{53}$. The "side-switch" is held in this position, and is subject to the tension of a spring $o^{56}$, it being observed that the said "side-switch" is adapted to be pivoted at $o^{57}$, so as to swing or vibrate in a horizontal plane. The said "side-switch" is provided with the five "side-switch-arms" $o^{58}$, $o^4$, $o^{59}$, $o^{60}$ and $o^{61}$, these arms all being rigidly connected but insulated from each other, and adapted to swing in unison. Consequently when the said "private-magnet" is energized in the manner explained, it attracts its armature and thereby moves the said "side-switch" from first position to second position. This is for the reason that when the armature $o^{45}$ is attracted, the finger $o^{54}$ is shifted into engagement with the inner tooth $o^{52}$; and then when the "private-magnet" is deënergized, the arm $o^{46}$ rises to its normal position, and in so doing allows the finger $o^{54}$ under the influence of the spring $o^{56}$, to escape and move into engagement with the second or outer tooth $o^{53}$; and this initial movement of the "side-switch" is limited by reason of the lug $o^{62}$, carried by the said "side-switch", being brought into engagement with the cam $o^{23}$. This shifting of the "side-switch" from first to second position brings the "side-switch-arm" $o^{58}$ into engagement with the contact $o^{63}$, the latter being grounded at $o^{64}$; and the same movement brings the wiper $o^4$ out of engagement with the contact $o^3$, thereby opening the circuit of the "vertical-magnet" $o^2$. In addition, the movement of the "side-switch" in this manner causes the "side-switch-arm" $o^{59}$ to engage the contact $o^{65}$ which latter is connected with the "private-magnet" $o^{44}$, as shown in Fig. 13. Immediately upon the closing of electrical connection between the ground $o^{64}$ and the "side-switch-arm" $o^{58}$, a local circuit is closed including the battery 12, the connections from the non-grounded pole of the battery to the "rotary-magnet" $o^{66}$, the connection from this magnet to the "side-switch-arm" $o^{58}$, and the ground connections $o^{64}$ and $o^{67}$. It will be seen that this "rotary-magnet" is provided with a pivoted or swinging armature $o^{68}$ adapted to vibrate or swing in a horizontal plane. It will also be observed that this armature of the "rotary-magnet" is provided with an arm $o^{69}$ carrying a pivoted spring-pressed ratchet-dog or actuating pawl $o^{70}$. In addition, said armature is provided with an interrupter-arm $o^{71}$ adapted to open and close the circuit-opening and closing springs $o^{72}$. Another arm, preferably made integral with the said armature $o^{68}$, is provided with an end portion $o^{73}$ adapted for vibrating or operating the armature $o^{45}$, so as to operate the "side-switch at times when the "private-magnet" is not energized. The entire structure of this armature $o^{68}$ is subject to the tension of a spring $o^{74}$ adapted to keep the said armature normally away from its magnet. The energizing of this "rotary-magnet" $o^{66}$, by the closing of the said grounded circuit including the "side-switch-wiper" $o^{58}$, causes it to attract its armature, and to thereby force the ratchet-dog or locking-pawl $o^{70}$ into engagement with the rotary ratchet-teeth $o^{22}$. In this way, the shaft $o^{15}$ is given one rotary step, and the circuit of the "rotary-magnet" is broken by reason of the separation of the springs $o^{72}$; and a further result of the energizing of the "rotary-magnet" in this way is the actuation, by means of its armature-finger $o^{73}$, of the "private-magnet-armature," and a consequent shifting of the finger $o^{54}$ into engagement with the second or outer tooth $o^{52}$. The forward rotation of the shaft $o^{15}$ in this way brings the wipers thereon into engagement with the first contacts in the first level of the banks; and if this particular set of contacts is not busy, the armature $o^{45}$, and its arm $o^{46}$, will be allowed to respond to the action of the spring $o^{49}$ as soon as the "rotary-magnet" is deënergized; and this action, it will be seen, causes the "side-switch" to escape and shift to third position, the movement being limited by the engagement of the finger $o^{54}$ with the stationary stop $o^{75}$. With this arrangement, therefore, the actuation of the "rotary-magnet" not only serves to rotate the switch-shaft, but also serves to operate the "side-switch" to third position, providing the first set of contacts in the banks are not busy—that is, not connected with a busy trunk-line. When shifted to third position, the "side-switch-arm" $o^{60}$ engages the contact-point $o^{76}$, which latter is connected with the "vertical-line-wiper" $o^{17}$. The same movement of the "side-switch" brings the "side-switch-arm" $o^{61}$ into engagement with the contact-point $o^{77}$, the latter being connected with the "rotary-line-wiper" $o^{18}$. Furthermore, the "side-switch-arm" $o^{59}$, by this final actuation of the "side-switch," is transferred from the contact $o^{65}$ to the grounded contact $o^{78}$, the latter being grounded at $o^{79}$. Consequently, the "private-magnet" is thereby disconnected from the "private-wiper" $o^{16}$, which latter remains connected with the "private-magnet" as long as the "side-switch" remains in second position. The grounding of the "private-wiper" in this manner serves to connect the "private-bank-contact" with the grounded pole of the battery 12, and to thereby set up a guarding potential at all of the multiples of this contact in other switches. Suppose, however, that the first set of contacts should be found to be already in use—that is, suppose the "private-wiper," upon engaging the first contact in the lower level of the "private-bank," should encounter a guarding potential by reason of this contact being connected to ground through the "private-wiper" of some other switch. In such case, the connection from the grounded pole of the battery through the "private-wiper" $o^{16}$ to the "private-magnet" (it being remembered that at this time the "side-switch-arm" $o^{59}$ is on the contact point $o^{65}$) will result in the closing of a local circuit including the said "private-magnet," and in the consequent energizing of the latter; and the "private-magnet" being thus energized, the deënergizing of the "rotary-magnet" will not be accompanied by a release of the "side-switch" to third position, and consequently the local circuit of the "rotary-magnet" will remain closed through the "side-switch-arm" $o^{58}$ and the grounded contact $o^{63}$. With this circuit thus retained in operative condition, the "rotary-magnet" continues to be alternately energized and deënergized, with the result that the ratchet-pawl $o^{70}$ will give the shaft $o^{15}$ a step-by-step rotary motion until the wipers carried by this shaft are brought around and into engagement with bank-contacts which are not busy; for as soon as the "private-wiper" $o^{16}$ encounters a non-busy contact in the level in which it is operating, the previously described grounded circuit through the "private-magnet" $o^{44}$ is broken, and the "side-switch" thus allowed to move to third position; and for the reason explained, the "rotary-magnet" $o^{66}$ ceases its operation as soon as the "side-switch" moves from second to third position. It will be understood, as in the previous case, that the framework of the switch may be of any suitable character, and that the usual or any suitable guides may be employed for directing the ratchet-pawls or actuating-dogs into and out of engagement with the vertical and rotary ratchet-teeth. A lamp $o^{80}$ is in the circuit completed by the engagement of the spring $o^{27}$ with the contact $o^{28}$, it being observed that this local grounded circuit is always closed as soon as the switch is off normal. In this way, a tell-tale signal is always displayed advising the exchange attendant as to what switches are in use, or as to what switches are, for any other reason, off normal. With the first "selector" thus operated, the trunk-line 9 is in connection with the idle trunk-line 16, and a guarding potential is established at all of the "private-bank-contacts" allotted to this line, thereby preventing seizure of the trunk-line 16 by other parties.

The second "selector" may be of exactly the same character as that shown in Fig. 13, and will not require a detailed illustration or explanation. This second "selector" responds to the impulses which represent the second digit of the number which is being called. For this reason, the said second "selector", when the calling subscriber manipulates the calling apparatus in the manner previously described, rises to the second level—that is to say, its shaft is raised upwardly to the second level of the banks, inasmuch as 2 is the second digit of the number being called. Obviously, this is done by first pressing the key 10 twice, so as to step the switch-shaft of the second "selector" up to the second level, and by then pressing the key 13 once for the purpose of causing the "private-magnet" of the second "selector" to operate the "side-switch" to second position. From this on, the operation of the second "selector" is identical with that just explained in connection with the automatic step-by-step rotation of the first "selector-shaft"—that is to say, the "shaft-wipers" of the second "selector" will automatically pick out a non-busy set of contacts in the same manner that an idle trunk-line was selected by the first "selector".

With the first and second "selectors" thus actuated, and held in said certain definite positions, the trunk-line 16 is now connected with the trunk-line 19, it being observed that this trunk-line 19 leads from the second "selector" to the "connector" shown in Fig. 14. As previously stated, this "connector-switch", or "connector" as it is commonly called, is used for receiving the impulses representing the last two digits of the called number, and for making connection directly with the line of the called subscriber. Also, as previously stated, this "connector" is, as a feature of special improvement, located outside of the main or central station, and at an auxiliary station which may be more or less distant from the said main or central station. Consequently, the operations corresponding to the last two digits of the called number occur at a point outside of the main or central station, and at a point more or less closely associated with the group of subscribers including the one which is being called. While this "connector", like the "individual-switches" and the first and second "selectors", may be of any suitable, known or approved character, it is preferably of the type indicated in the drawings, and shown more in detail in Fig. 14. When the calling subscriber again presses the key 10, so as to send a single impulse over the "vertical-line-conductors", a temporary grounded circuit is completed including the "vertical-relay" $x$ and the battery 24. The energizing of this "vertical-relay" in this manner effects the closure of a local grounded circuit including the ground $x^1$, the normally-separated switch-springs $x^2$ and $x^3$, the conductor $x^4$, the "private-magnet-switch-springs" $x^5$ and $x^6$, the "side-switch-arm" $x^7$, the contact $x^8$, the "vertical-magnet" $x^9$, and the connections to the non-grounded pole of the battery 24. This "vertical-magnet" is provided with an armature $x^{10}$ which is pivotally or swingingly mounted, like those already described. Said armature is provided with the usual arm $x^{11}$ held in its normal position by a spring $x^{12}$, so that the said armature is normally away from its magnet. At its end, said arm is provided with a pivoted and spring-pressed ratchet-pawl or actuating-dog $x^{13}$, and at its middle with an L-shaped lug $x^{14}$. The latch-arm or locking-link $x^{15}$ is held in its normal position by a spring $x^{16}$, and is provided with an apertured end portion. The dogs $x^{17}$ and $x^{18}$ are similar to those already described, and are adapted to be pivotally mounted at $x^{19}$. These locking-dogs are subject to the tension of a spring $x^{20}$, and are provided with a downwardly-extending arm $x^{21}$, and with a short finger or projection $x^{22}$ adapted to engage the aperture in the end of the link or arm $x^{15}$. At its lower end, the shaft $x^{23}$ is provided with the usual "private-wiper" $x^{24}$, and with the "vertical" and "rotary" "line-wipers" $x^{25}$ and $x^{26}$, all insulated from each other and from the shaft. The contacts of the "private-banks" $x^{27}$ are like those already described, and are adapted to coöperate with the said "private-wiper". In a similar way, the pairs of contacts of the "line-banks" $x^{28}$ are adapted to coöperate with the said "vertical" and "rotary" "line-wipers", each pair being connected with a subscriber's line of the group to which the "connector" is allotted. In this way, there are, say, one hundred subscribers' lines leading to the "line-bank" of this "connector", each pair of "line-contacts" being multipled with all of the other pairs of "line-contacts" which are allotted to any particular trunk-line in the other "connectors". In this way, each subscriber's line is connected with ten different pairs of "line-contacts" distributed through as many different "connectors". In addition, there are ten "private-bank-contacts" allotted to each line, each "private-bank-contact" being multipled with all other "private-bank-contacts" which are allotted to any particular subscriber's line, in all of the different "connectors". At its upper end, the shaft $x^{23}$ is provided with the previously described clock-spring device $x^{29}$, and with the normal post $x^{30}$ and the normal post arm $x^{31}$. It will be seen that the vertical ratchet-teeth $x^{32}$ are, like those previously described, provided with the vertical groove or channel $x^{33}$ adapted to be normally engaged by the hook-shaped supporting-dog or stationary projection $x^{34}$. For this reason, the "connector-shaft", like those of the "selectors" and "individual-switches", can only move up and down when the said groove or channel is in engagement with the said hook-shaped dog $x^{34}$. The rotary ratchet-teeth $x^{35}$ are like those previously described, which is also true of the cam $x^{36}$. Normally, the dogs $x^{18}$ and $x^{17}$ are out of engagement with the vertical and rotary ratchet-teeth of the shaft, and are only in engagement therewith when the shaft is thrown into operation and used for making connection with the subscriber's line. The single impulse transmitted through the "vertical-magnet", in the manner previously described, causes it to attract its said armature, and to thereby force the pawl $x^{13}$ into engagement with the ratchet-teeth $x^{32}$. At the same time, the upward movement of the arm $x^{11}$ causes the lug $x^{14}$ to lift the latch or locking-link $x^{15}$ out of engagement with the finger or projection $x^{22}$, so as to release the two locking-dogs and allow them to engage their respective ratchet-teeth. The shaft, when thus given one vertical step, is supported against downward movement by the dog $x^{18}$, and is then ready to be rotated for the purpose of making a connection corresponding to the last digit of the called number. Before this is done, however, the calling subscriber presses the key 13 once, so as to transmit a single impulse over the so-called "rotary-line-conductors", and so as to thereby send a single impulse through the "rotary-relay" $x^{37}$—that is, so as to close a grounded circuit including the said relay and the battery 24. The "rotary-relay" when thus energized closes a local circuit including the ground $x^1$, the springs $x^2$ and $x^{38}$, the conductor $x^{39}$, the "private-magnet" $x^{40}$, and the connections to the non-grounded pole of the battery 24. The single impulse generated in the local circuit including the said "private-magnet" causes the latter to attract its pivoted or swinging armature $x^{41}$, the latter being provided with the previously described arm $x^{42}$ having the flat springs $x^{43}$ and $x^{44}$. Like the "private-magnet" apparatus of the previously described switches, this arm $x^{42}$ is provided with a lateral finger $x^{45}$ adapted to operate the switch-springs $x^5$, $x^6$ and $x^{46}$. Normally, the finger $x^{47}$ of the "side-switch" $x^{48}$ projects between the said flat springs, and in engagement with the first or inner tooth $x^{49}$, as shown in Fig. 14. When this "private-magnet" is energized, however, its armature overcomes the tension of the spring $x^{50}$, and causes the finger $x^{47}$ to engage the first or inner tooth $x^{51}$, it being observed that these ratchet-teeth are like those already described. When the "private-magnet" is deënergized by the cessation of current in the "line-circuit" and the consequent deënergizing of the "rotary-relay", the armature $x^{41}$ is released, the arm $x^{42}$ rises, and the finger $x^{47}$ is allowed to escape and engage the second or outer tooth $x^{49}$. This, it will be seen, is due to the action of the spring $x^{52}$, which is applied to the said "side-switch", the outward movement being limited by reason of the lug or projection $x^{53}$ on the "side-switch" being brought into engagement with the cam $x^{36}$. This "side-switch" is adapted to be pivoted at $x^{54}$, so that it may swing or vibrate in a horizontal plane in the manner previously explained. The said "side-switch" is provided with four "side-switch-arms" $x^7$, $x^{55}$, $x^{56}$ and $x^{57}$, all insulated from each other and adapted to swing or operate in unison. The release of the "side-switch" from first to second position, by the single impulse sent through the "private-magnet", shifts the "side-switch-arm" $x^7$ from the contact-point $x^8$ onto contact-point $x^{58}$, the latter being connected with the "rotary-magnet" $x^{59}$. Also, the actuation of the "side-switch" in this manner causes the "side-switch-arm" $x^{55}$ to move onto the contact-point $x^{60}$, the latter being connected with the springs $x^{46}$ and $x^{61}$. The shaft $x^{23}$, when thus given a single vertical step, carries its wipers $x^{24}$, $x^{25}$ and $x^{26}$ into the plane of the first level—that is, into the plane of the first or lowermost rows of terminals or contacts in the "private" and "line" banks, but not into engagement with the latter. The calling subscriber then presses the key 10 once, which corresponds to the last digit of the called number, and thereby again energizes the "vertical-relay" $x$ over a grounded "line-circuit" including the battery 24 and the "vertical-line-conductors" of the circuit completed thus far. This time, however, the closing together of the springs $x^2$ and $x^3$ completes a local grounded circuit including the battery and the ground connections, and including also the "rotary-magnet" $x^{59}$, the contact $x^{58}$, the "side-switch-arm" $x^7$, and the springs $x^6$ and $x^5$, these latter springs thus serving as part of the local circuits of both the "vertical" and "rotary" magnets. The single impulse thus generated in the local grounded circuit of the "rotary-magnet" causes the latter to attract its armature $x^{62}$, the latter being pivotally or swingingly mounted in such manner as to vibrate or swing in a horizontal plane. This armature is provided with the usual arm $x^{63}$, which is subject to the tension of a spring $x^{64}$, the latter tending to keep the said armature normally away from its magnet. At its end, the said arm $x^{63}$ is provided with a pivoted and spring-pressed ratchet-dog or actuating-pawl $x^{65}$, which latter is adapted to engage the ratchet-teeth $x^{35}$. Consequently, when the said "rotary-magnet" is energized and deënergized, it first pulls its armature toward it and then releases the latter, and thereby causes the pawl $x^{65}$ to rotate the shaft one step. This, of course, will bring the shaft-wipers into engagement with the first contacts or terminals in the first level of the banks, and these contacts, it will be seen, belong to the line 22 running to the called subscriber's station. Assuming that this called subscriber's line is not busy, it is only necessary to then again press the key 13 at the calling subscriber's station, so as to again actuate the "private-magnet" $x^{40}$ for the purpose of releasing the "side-switch", in the manner already described, and permitting the latter to move to third position. In its final movement, in this manner, the said "side-switch" is limited by the finger $x^{47}$ striking the stationary stop $x^{66}$, it being understood that at this juncture the final impulse sent over the "rotary-line-conductors" again energizes the "rotary-relay" $x^{37}$, causing it to again momentarily close the circuit of the "private-magnet" $x^{40}$; and in this way, the final part of the operation of calling the subscriber brings about the transposition of the "side-switch" off the "connector" from second to third position. To then ring the called subscriber, it is only necessary, as previously described, for the calling subscriber to attract the attention of the called subscriber through the medium of any suitable, known or approved ringing arrangement. For example, the calling subscriber can press the ringing-key 29, shown in Fig. 15, so as to ground the "vertical-line-conductor" at the calling subscriber's station. This will result in the energizing of the "vertical-relay" $x$, and in the closing of a local circuit including the battery 24 and the ground connections, the springs $x^2$ and $x^3$, the conductor $x^4$, the springs $x^5$ and $x^6$, the "side-switch-arm" $x^7$, the contact $x^{67}$, the ringer-relay $x^{68}$, and the connections to the non-grounded pole of the battery; it being remembered that at this time the "side-switch" is in third position, and that consequently the "side-switch-arms" $x^{56}$ and $x^{57}$ are respectively in engagement with contact $x^{69}$ and $x^{70}$, the trunk-line 19 being thus engaged with the "line-wipers" $x^{25}$ and $x^{26}$. The energizing of the ringer-relay $x^{68}$ causes it to attract its armature, and to thereby sever the connection between the trunk-line-conductors $x^{71}$ and the "side-switch-arms" $x^{56}$ and $x^{57}$. At the same time that this is accomplished by the separation of the springs $x^{72}$, $x^{73}$, $x^{74}$ and $x^{75}$, the springs $x^{73}$ and $x^{74}$ are brought respectively into engagement with the springs $x^{76}$ and $x^{77}$. In this way, the pressing of the ringing-key at the calling subscriber's station opens up the "line-circuit", and at the same time bridges the ringing-generator $x^{78}$ across the portion of the circuit extending from the gap or opening to the called subscriber's station. Obviously, as long as the ringing-generator remains bridged across the called subscriber's "line-circuit", the bell 30 at the called subscriber's station will continue to ring. When the called subscriber takes down his receiver 1 shown in Fig. 16, the talking-circuit between the two subscribers is completed, the current for talking purposes being furnished by the local batteries 31 which are included in the normally-open circuits of the transmitters 32, in the usual manner; but it will be understood that, for the purposes of my invention, the current for talking purposes can be supplied from any suitable source. Suppose, however, that the called subscriber's line should be found busy. In such case, the "private-wiper" $x^{24}$ would encounter a guarding potential at the "private-bank-contact" corresponding to the line of the called subscriber, and would thus establish an electrical connection from the grounded pole of the battery—by reason of the ground connection established through some other "connector-switch"—through the "private-wiper" $x^{24}$ to the "side-switch-arm"

$x^{55}$ and the contact $x^{60}$, and thence to the "rotary-line-relay-spring" $x^{61}$. In this way, when the calling subscriber presses the key 13 for the last time, for the purpose previously described, a local circuit will be immediately completed from the grounded pole of the battery through the connection just described, through the springs $x^{61}$ and $x^{79}$ to the conductor $x^{80}$ leading to one terminal of the "release-magnet" $x^{81}$, and thence by the connections shown to the non-grounded pole of the battery. The said "release-magnet" is provided with the pivoted or swinging armature $x^{82}$ having an arm $x^{83}$ adapted, at its lower end, to engage the arm $x^{84}$ of the structure with which the two locking-dogs are rigid, as previously described. At this time, it will be seen that the two locking-dogs are released, and are in engagement with their respective ratchet-teeth, the locking-link $x^{15}$ being at this time supported by the L-shaped lug $x^{14}$. The said armature $x^{82}$ is provided with a spring $x^{85}$ which tends to hold it normally away from its magnet. When the said "release-magnet" is thus energized, it attracts its said armature, and thereby restores the locking-dogs $x^{18}$ and $x^{17}$ to their normal positions. At the same time, the finger or projection $x^{22}$ is forced into engagement with the aperture in the end of the locking-link or arm $x^{15}$, and the locking-dogs thus locked out of engagement with the ratchet-teeth. When thus unlocked, the shaft $x^{23}$ revolves, of course, to its normal position, and then drops downward to its normal vertical position. The "side-switch" is also restored, when the "release-magnet" is thus energized, by reason of the link connection $x^{86}$ between the said "side-switch" and the lower end of the arm $x^{21}$. In other words, the automatic energizing of the "release-magnet", brought about by the engagement of the "private-wiper" $x^{24}$ with a charged or busy contact, effects a complete restoration of all parts of the switch to their normal positions. After this, the calling subscriber will attempt to ring the called subscriber, in the manner explained; but instead of ringing the bell at the called subscriber's station, the pressure of the ringing-key 29 will only serve to ground the vertical side of the "line-circuit", and to thereby energize the "vertical-relay" $x$. This, of course, will result in the energizing of the "vertical-magnet" $x^9$, and in the actuation of the shaft $x^{23}$ upwardly one step—that is, the pressure of the ringing-key 29 will only result in the raising of the shaft $x^{23}$ to the first level. This, of course, it will be seen is sufficient to bring the contacts $x^{87}$ and $x^{88}$ together, thus connecting the "side-switch-wiper" $x^{56}$ with one side of the "line-circuit" extending back to the calling subscriber, and thence through the calling subscriber's receiver, back over the other side of the calling subscriber's line to the "vertical-relay" $x$, and thence through the connections to the non-grounded pole of the battery, the circuit then being completed through the ground connections and the "busy" machine, through the conductor leading back to the contact $x^{87}$, and thence through the spring $x^{88}$ to the contact $x^{89}$. In this way, the calling subscriber will get the "busy" signal as soon as he discontinues the pressure on the key 29. If the "connector" makes the desired connection with the called subscriber's line, the "private-wiper" $x^{24}$, by reason of its connection at such time with the ground $x^{90}$, will establish a guarding potential at all of the "multiple-private-bank-contacts" allotted to such line in the different "connector-switches". Consequently, no other subscriber can then obtain connection with this called subscriber's line, for the reason just explained. Preferably, the condensers $x^{91}$ are located in opposite sides of the "line-circuit" of the "connector-switch", and at a point between the bridge formed by the said "vertical" and "rotary" "line-relays", and the other bridge formed by the "back-release-relays" $x^{92}$. When the "side-switch" is in third position, the grounded pole of the battery is connected, through the "side-switch-arm" $x^{55}$ and the contact $x^{93}$, with the "private-wiper" $x^{24}$, in the manner shown and described.

With the apparatus of the character shown, the "line-relays" remain in bridge across the talking-circuit during conversation, so that the release or restoration of the different switches employed for making connection between any two subscribers' lines is brought about by simultaneously energizing both "line-relays" of the different switches in use at that time. The release is brought about by the calling subscriber by simply grounding both sides of the line, so as to simultaneously energize the "line-relays" $x$ and $x^{37}$. The operation is then as follows: For example the calling subscriber can release the switches automatically by simply hanging up his receiver; for when this is done, the insulated projection 33 of the switch-hook engages the spring 34, thus bringing this spring and the springs 35 and 36 together, the latter being at such time connected to ground at 5. As the springs 34 and 35 are connected with opposite sides of the "line-circuit," both "line-relays" at the "connector-switch" will be energized, thereby closing the previously described circuit of the "private-magnet" $x^{10}$. This, of course, results in the bringing together of the springs $x^5$ and $x^{46}$, which latter are in the normally-open circuit of the "release-magnet" $x^{81}$; and as springs $x^3$ and $x^2$ are also together at this time, by reason of the energizing of the "vertical-relay," it will be seen that a local circuit is completed from the non-grounded pole of the battery through the "release-magnet," through springs $x^{61}$ and $x^{70}$, through springs $x^5$ and $x^{46}$, and thence through the springs $x^2$ and $x^3$ to ground and back to battery. This effects a release of the switch mechanism, in the manner explained; but as the springs $x^6$ and $x^5$ are separated by the actuation of the "private-magnet," it will be seen that no circuit is formed through the ringer-magnet $x^{68}$. Simultaneously with the energizing of the "line-relays" of the "connector," all of the other "line-relays" left in bridge across the circuit are energized—that is to say, the "line-relays" left in bridge across the circuit at the "individual-switch," the first "selector," second "selector" and "connector" are all energized simultaneously. For example, the "rotary-line-relay" $u^{17}$ and the "vertical-line-relay" $u^{75}$ are both energized as soon as the calling subscriber hangs up his receiver, it being observed that these two relays are in bridge across the talking circuit, and have their middle points connected with the non-grounded pole of the battery through the medium of the bridge cut-off springs $u^{76}$. At the first and second "selectors," the "vertical" and "rotary" "line-relays" also remain bridged across the talking circuit during conversation, and in each case the bridge has its middle point connected with the non-grounded pole of the battery. At the "individual-switch," the energizing of the "vertical relay" $u^{75}$ closes a circuit from the non-grounded pole of the battery through the "release-magnet" $u^{39}$, through the springs $u^{77}$ and $u^{21}$, and thence through the springs $u^{19}$ to the grounded pole of the battery; it being observed that the energizing of the rotary-line-relay" $u^{17}$ closes together the springs $u^{19}$, in the manner previously described. The energizing of the "vertical-line-relay" $u^{75}$ separates the springs $u^{20}$ and $u^{21}$, thus preventing the energizing of the "private-magnet" $u^{25}$. When the "release-magnet" $u^{39}$ attracts its armature $u^{33}$, the latter causes the aperture in the end of the arm $u^{41}$ to engage the projection or finger $u^{37}$ carried by the structure of the two locking-dogs. At the first and second "selectors" the energizing of the "vertical" and "rotary" "line-relays" brings about the energizing of the "release-magnets" of these two switches. For example, in the first "selector" a circuit is completed from the non-grounded pole of the battery through the "release-magnet" $o^{37}$, through the springs $o^6$ and $o^{51}$,—the "private-magnet" $o^{44}$ being also energized—and thence through the springs $o^7$ and $o^8$ to ground and back to battery. At the same time, the springs $o^5$ and $o^6$ are separated by the energizing of the "private-magnet" $o^{44}$. The energizing of the "release-magnet" $o^{37}$ causes the aperture in the end of the arm $o^{39}$ to engage the finger or projection $o^{36}$, the latter being carried by the structure of the two locking-dogs. It will be seen that at the "connector" the restoration is effected upon the energizing of the "release-magnet"; but at the "selectors" and "individual-switches" the release is not effected until the "release-magnets" of these particular switches are deënergized, thus allowing the springs which control the armatures thereof to draw the locking-dogs out of engagement with the ratchet-teeth. Consequently, the "connector" will release first, and the "selectors" and "individual-switch" immediately after, it being understood, however, that the releasing of all the switches is practically simultaneous. When released, each shaft responds to the action of its clock-spring device, and thus resumes its normal condition. If the called subscriber breaks the connection between his line and that of the calling subscriber, the restoration is brought about by the placing of the receiver upon the hook-switch at the called subscriber's station, and by the consequent bringing together of the springs 34, 35 and 36 in the manner previously explained. This will complete a grounded circuit including the two sides of the line in parallel, and including the "line-wipers" $x^{25}$ and $x^{26}$, the "side-switch-arms" $x^{56}$ and $x^{57}$, and the "back-release-relays" $x^{92}$, it being observed that these relays are bridged across the "line-circuit" and have their middle point connected with the non-grounded pole of the battery. The energizing of these "back-release-relays" closes a circuit through the "release-magnet" $x^{81}$, said circuit including the "back-release-relay-springs" $x^{94}$, one of which latter is connected with one terminal of the "release-magnet" and the other with ground at $x^{95}$. In this way, the called subscriber can effect a release of the "connector," but not of any of the other switches employed in making any connection with his line; and it is well known that if a called subscriber can hang up and thereby simply release the "connector," he can then start such an investigation as will enable the exchange employees to trace the source of the call, and thereby protect the called subscriber against persistent attempts to annoy on the part of some other subscriber.

Referring to Figs. 15 and 16, which illustrate, respectively, the calling and called subscriber's apparatus, it will be seen that the switch-hook 2 is provided with an integral projection 37 adapted to engage the contact 3 when the receiver is removed, as previously described. When the switch-hook is restored to its normal position, however, this projection 37 passes on to the other side of this contact 3, the latter being provided at this side with a layer of insulation; and for this reason no electrical connection between this contact 3 and the switch-hook is made when the receiver is replaced. When the switch-hook rises, the end of the arm 33 passes upwardly between the springs 34 and 35, thus preventing these three springs from being grounded together; but when the receiver is replaced upon the hook, the projection 33 then passes outside of the upper end of the spring 34, thus grounding both sides of the line in the manner set forth. The said switch-hook is also provided with an integral projection 38 adapted to normally engage the spring 39, the latter being connected with the bell 30. In this way, the said bell is normally bridged across the circuit through the medium of the switch-hook. The contacts 40 are normally separated, but are brought together when the switch-hook rises, so as to close the local circuit of the transmitter. The receiver-circuit includes the normally-open contacts 41, the same being operated by the insulation 42 carried by the switch-hook. The connection between the ground 5 and the contact 3 includes the contacts 43, these contacts being operated by the insulation 44 on the switch-hook. These contacts 43 are also included in the connection or conducting path by which one side or the other of the line is grounded by pressing the keys 10 and 13 into engagement with the contact-points 45 and 46. In ringing, the line-conductor 11 is connected with the ground 5 through the medium of the key 29 and the contact-point 47, the receiver-circuit at such time being open by reason of the disengagement of the key 29 from the contact 48. Obviously, the contacts 37 and 3 must make and break contact before the contacts 41 are brought together, and after the contacts 38 and 39 are separated. Also, the connection between the ground 5 and the contacts 45 and 46 is not closed until the switch-hook rises and thereby allows the contacts 43 to come together.

With further reference to the "individual" and "selector" switches, it will be seen that the deënergizing of the "release-magnets" in these switches permits the springs controlling the armatures thereof to draw the "side-switch" of the "individual-switch" or "selector-switch," as the case may be, into its normal position. For example, in Fig. 12 the said arm $u^{36}$ is connected by a link $u^{78}$ with the "side-switch" $u^{53}$, whereby the retraction of the armature $u^{38}$ by the spring $u^{40}$ not only disengages both of the locking-dogs from their respective ratchet-teeth, but also, as stated, pulls the "side-switch" into its normal position. In a similar way, the link $o^{81}$ connects the arm $o^{35}$ of the first "selector"—as shown in Fig. 13,—with the "side-switch" $o^{53}$. Consequently the retraction of the armature $o^{38}$ by means of the spring $o^{40}$ not only disengages the two locking-dogs from their respective ratchet-teeth, but also pulls the "side-switch" of the "selector" into normal position. It will be readily understood that this is also true of the second "selector."

With further respect to the ratchet-teeth carried by the horizontal arms which project from the armatures of the "private-magnets", in the different switches, it will be seen that these teeth are so formed as to permit the fingers of the "side-switches" to be readily restored to their normal positions. In other words, the finger $u^{56}$, shown in Fig. 12, can move readily into its normal position when the "release-magnet" is deënergized, as the two flat springs $u^{45}$ and $u^{46}$ can separate sufficiently, under the pressure of the said finger upon the beveled edges of the said teeth, to permit the finger to regain its normal position inside the teeth and between the two springs. This, it will be understood, is also true of the first and second "selectors", and the "connectors."

From the foregoing it will be seen that the switches which respond to impulses representing digits of a called number are considerably less in number than the total number of subscribers. The "individual-switches" are, of course, the same in number as the subscribers, and are operated by preliminary impulses, preferably in the manner described. By a preliminary impulse, however, I mean any current-flow which traverses the calling subscriber's "line-circuit" for the purpose of operating a switching device or apparatus before any impulse or current-flow reaches the switch, of any suitable character, which is to perform an operation or operations corresponding to the first digit of the called number. In other words, and for the broader purposes of my invention, a preliminary impulse may consist of a current-flow brought about in any suitable manner, and employed for accomplishing any desired or necessary switching operations preliminary to all switching operations which correspond to the digits of the called number. Consequently, any suitable or desired switching apparatus can be employed at the subscribers' stations, consistent with the broad idea of operating the "individual-switch" before the first "selector" makes a selection corresponding to the first digit of the called number. In fact, any arrangement by which the calling subscriber accomplishes a preliminary selection or connection of his line with a trunk-line, or other conductors, before any switching means are employed for making a trunk-line selection corresponding or in any degree relative to the first digit of the called number, is obviously within the contemplation of my invention. That is to say, in one respect, my invention broadly contemplates an automatic telephone system, substantially as described, in which the step-by-step or other automatic switches which receive and respond to the impulse or impulses representing the first digit of any called number, are less in number than the total number of subscribers' telephone lines, as, for example, ten per cent. of the total number of subscribers' lines leading into the exchange or central station, said lines having stationary individual line-relays by which the calling subscribers control or start the operation of the preliminary trunking mechanism.

Step-by-step automatic switches, of the character described, have been employed prior to my present invention. For example, the "individual-switches" and the "selectors" are, it will be seen, of the well-known general type described in British patent to Haddan, No. 18,747 of 1902. It will also be seen that the herein described "connectors" are of the general type described and illustrated in Patent No. 815,176, granted March 13, 1906, to Keith, Erickson and Erickson. Practically, therefore, the herein described step-by-step automatic switches are all of substantially the same character, each involving a rotary switch-shaft and "line" and "private" banks; a "side-switch" and "private-magnet" for operating the same; a "vertical-magnet" for giving the shaft a vertical or endwise step-by-step movement, and a "rotary-magnet" for giving the same a rotary step-by-step movement; and a pair of locking-dogs adapted to be operated by the armature of the "release-magnet", together with connections whereby the "release-magnet-armature" is also adapted to restore the "side-switch". If the switch is to be used as an "individual-switch" or as a "selector", either first or second, the "rotary-magnet-armature" is provided with means for operating the "side-switch", and with means for intermittently opening and closing its own circuit; and in this way, the "individual-switches" and "selectors" are, as previously explained, each adapted to rotate automatically until an idle trunk-line is found. If this type of switch, or of step-by-step switching mechanism, is employed as a "connector", then the rotation of the switch-shaft, as well as its vertical or endwise movement, is under the control of the calling subscriber. As the switches are of the bridging type, it is evident that all of the different relays left in bridge along the circuit will click in unison with those of the "connector" when the calling subscriber, in operating the "connector", throws ground first on one side of the line and then the other. It is evident, however, that at such time the energizing of the "line-relays" of the "individual" and "selector" switches will accomplish nothing, and will not disturb the connections made by the "individual" and "selector" switches. As illustrated, each subscriber's line terminates at an auxiliary station, and is there normally connected with a pair of movable switch-arms, and also with ten sets of "line" and "private" bank-terminals, these ten sets being distributed through as many "connectors" at the said auxiliary station. Also, at each auxiliary station, each out-going trunk-line is there connected with ten sets of "line" and "private" bank-contacts, these sets being distributed through as many different "individual-switches". On the other hand, however, each incoming trunk-line at an auxiliary station is connected with a pair of movable switch-arms of one of the ten "connectors". Obviously, the circuits and arrangement of the relays, etc., of the said switches can be varied or changed to suit the conditions or requirements of different cases; and it is also obvious that the resistances of the different magnets and relays can be adjusted in any way that may be found necessary or desirable. Normally, the subscribers' lines are, it will be seen, disconnected from the central station through the medium of which all exchanges or connections must be made. Any number of subscribers can be grouped together, and the switches can be employed on any suitable or desirable percentage basis; but whatever the arrangement, the central station is preferably connected with each auxiliary station by a cable containing both incoming and out-going trunk-lines. Consequently, each subscriber is provided with means whereby he may, in attempting to call some other subscriber, connect his line with a trunk-line leading to the central station, through the medium of an automatic switch at the auxiliary station at which his line terminates.

In Fig. 12 the conductors $u^{79}$ and $u^{80}$ are line-circuit-conductors and lead to the "line-contacts" of all the "connector-switches" having contacts corresponding to this particular subscriber's line. The conductor $u^{81}$ leads to the "private-bank-contacts" of all "connectors" having contacts corresponding to this particular subscriber's line. It will be seen that the conductors $u^{79}$ and $u^{80}$ are normally connected with the subscribers' line-wires 11 and 4 through the medium of the "side-switch-arms" $u^{51}$ and $u^{52}$ and their normal or resting-contacts $u^{82}$ and $u^{83}$. The conductor $u^{81}$ is normally connected with the magnet $u^{84}$ of the bridge cut-off relay $u^{84}$ through the medium of the "private-side-switch-arm" or wiper $u^{50}$ and its normal or resting-contact $u^{85}$. When some other subscriber, through a "connector", calls and makes connection with the line $o$, it is preferable to remove the "line-relays" of this called subscriber's "individual-switch" from the circuit—that is, to open up the bridge containing these relays and normally existing across the called subscriber's "line-circuit". When the calling subscriber calls the line $o$, the "connector" used for this purpose causes its "private-shaft-wiper" to put current on the conductor $u^{81}$, and the current flowing from this circuit energizes the bridge-cut-off relay $u^{84}$, thereby causing the latter to separate the normally-closed contacts $u^{76}$. This will open the bridge containing the "line-relays" $u^{17}$ and $u^{75}$, and thus prevent the ringing currents projected out on the called line by the calling subscriber from being short-circuited; and the removal of the bridge in this manner obviously produces a beneficial result with respect to voice currents when the subscribers are talking. Furthermore, when the line $o$ is being used as a calling line, then the calling subscriber is protected against seizure of his line by reason of the "private-side-switch-arm" $u^{50}$ being thrown into engagement with the grounded contact $u^{71}$. When this is done, current flows from the grounded pole of the battery through the contact $u^{71}$ and the "side-switch-arm" $u^{50}$, thence through the conductor $u^{81}$ to the "private-bank-contacts" which correspond to the line $o$ in all of the "connectors" having contacts allotted to this particular line. Consequently, no other subscriber can seize the line $o$ after the subscriber to whom this line is allotted has operated his "individual-switch" and thereby created a guarding potential in all "connectors" having contacts allotted to his line. When some other subscriber obtains connection with the line $o$, current flows from the grounded pole of the battery through the "connector" then in use, thence over the conductor $u^{81}$, through the "side-switch-arm" $u^{50}$ and the contact $u^{85}$, through the magnet $u^{84}$, and through the conductors $u^{86}$ and $u^{87}$ to the non-grounded pole of the battery. In this way, a calling subscriber, upon obtaining connection with the called subscriber, automatically removes the "line-relay-bridge" normally existing across the called subscriber's line at the "individual-switch" allotted to such called subscriber's line.

With the arrangement shown and described, it will be seen that I provide what may be called a district telephone system having central and sub-central stations so connected and organized that all calls pass through the central station. In other words, a subscriber in calling another subscriber of the same sub-central station must do so by extending the necessary connection through the main or central station. With the arrangement shown and described, all calling subscribers first cause the sub-central apparatus to perform preliminary trunking operations before any switching or connecting operations are performed at the central station or elsewhere relative to the called number. In other words, the preliminary trunking operation by which any calling subscriber is connected with the main or central station has no reference whatever to the called number, and the means for then extending the connection in accordance with all of the digits of any called number may be of any suitable, known or approved character, at least as far as the broader purposes of my invention are concerned. In fact the said individual-switches or preliminary trunking apparatus may be employed for enabling calling subscribers to automatically select idle trunks or other connecting devices. For this reason I do not limit myself to automatic trunking or connecting machinery at the main or central station. With the arrangement shown and described, the subscribers' telephone lines are provided with individual line-relays at the sub-central stations, and the trunk-selecting machinery at the sub-central stations is normally at rest. Preferably, also, the automatic trunking machinery at the main or central station, when such machinery is employed, is also normally at rest. In other words, when no subscribers are calling there are no individual-switches or selectors or connectors which are in motion or in operation.

What I claim as my invention is:

1. A telephone system comprising a number of subscribers' lines, non-numerical switches at an automatic station in which said lines terminate, and a plurality of trunk-lines leading to another station, said trunk lines being less in number than the subscribers' lines, together with means whereby connection between any two of said subscribers' lines can only be established through the medium of an incoming and an outgoing trunk line connection between the said stations, said non-numerical switches having motion in two intersecting planes.

2. A telephone system comprising a plurality of subscribers' stations, a central station and an auxiliary station, the said auxiliary station having suitable connection with the said subscriber's station, and having trunk-line connection with the said central station, the number of trunk lines between the auxiliary and central stations being less than the number of subscribers' stations connected with the said auxiliary station; the said auxiliary station being equipped with non-numerical automatic switching devices for establishing connection between the calling subscribers' lines and the trunk lines, the subscribers' lines being normally disconnected from the said trunk lines; and the said central station being equipped with switchboard apparatus, of any suitable character, for making necessary trunking connections subsequent to the automatic connection of a calling subscriber's line with one of said trunk lines, said non-numerical switches having motion in two intersecting planes.

3. In a telephone exchange system, the combination of a main or central station, sub-central stations, trunk-lines connecting the main station with the sub-central stations, means at the sub-central stations for making final connections in accordance with the last two digits of the called number, means at the main station for first making trunk connections in accordance with all other digits of the called number, means at the sub-central stations for making preliminary trunk connections, subscribers' devices for operating said preliminary trunking means, and subscribers' calling devices for transmitting electrical impulses corresponding to the called number, said preliminary trunking means having motion in two intersecting planes.

4. In a telephone exchange system, the combination of subscribers' telephone lines, trunk-lines, subscribers' individual non-numerical selectively-operated trunking switches, selectors and connectors, and subscribers' devices for controlling the same, said connectors and individual switches being mounted together on switchboards by themselves, each group of connectors being less in number than its associated group of individual-switches, and each switchboard representing the particular group of subscribers whose lines terminate in the individual-switches thereon, said non-numerical switches having motion in two intersecting planes.

5. In a telephone exchange system, the combination of subscribers' telephone lines divided into groups, an individual non-numerical trunking switch for each telephone line, selectors less in number than said individual-switches, connectors less in number than said individual-switches, incoming and outgoing trunk-lines connecting the selectors with the individual-switches and connectors, and subscribers' devices for controlling the same, said individual-switches and connectors being separated from the selectors and mounted together on switchboards by themselves, each switchboard representing a particular group of telephone lines, said non-numerical switches having motion in two intersecting planes.

6. In a telephone exchange system, the combination of a plurality of switchboards, each board being provided with a plurality of subscribers' individual non-numerical trunking switches, and with a plurality of automatic progressively movable connectors, the connectors being less in number than the said individual-switches, but each connector having a multiple terminal of each of the different subscribers' lines terminating at said individual-switches, and each board representing a particular group of subscribers, said non-numerical switches having motion in two intersecting planes.

7. In a telephone exchange system, the combination of a plurality of switchboards, each board provided with a plurality of subscribers' individual line-relays, non-numerical trunking machinery controlled by said relays, and a plurality of automatic progressively movable connectors, the connectors of each board being less in number than the telephone lines terminating thereat, but each connector having a multiple terminal of each telephone line of the board on which it is mounted, and each board representing a different group of subscribers, said non-numerical switches having motion in two intersecting planes.

8. In a district telephone exchange system, the combination of a main or central station, outlying sub-central stations, comparatively short telephone lines terminating at said sub-central stations, comparatively long incoming and outgoing trunk-lines connecting the central station with the sub-central stations for talking purposes non-numerical automatic switching means at the sub-central stations for connecting calling telephone lines with idle incoming trunk-lines, suitable means for connecting all selected incoming trunk-lines with idle outgoing trunk-lines, and a temporarily established talking circuit passing twice through one and the same sub-central station, said non-numerical switches having motion in two intersecting planes.

9. In a telephone exchange system, the combination of a main or central station, sub-central stations, trunk-lines connecting the main station with the sub-central stations, means at the sub-central stations having vertical and rotary motion for making final connections in accordance with the last two digits of the called number, means at the main station having vertical and rotary motion for first making trunk connections in accordance with all other digits of the called number, and means at the sub-central stations for making preliminary trunk connections, said last means having motion in two intersecting planes.

10. In a telephone exchange system, the combination of subscribers' telephone lines, trunk-lines, subscribers' individual non-numerical selectively-operated trunking switches, selectors and connectors, and subscribers' devices for controlling the same, said connectors and individual-switches having vertical and rotary motion and being mounted together on switchboards by themselves, each group of connectors being less in number than its associated group of individual-switches, and each switchboard representing the particular group of subscribers whose lines terminate in the individual-switches thereon.

Signed by me at Chicago, Illinois, this 11th day of October, 1904.

ALEXANDER E. KEITH.

Witnesses:
W. LEE CAMPBELL,
R. H. BURFEIND.